(12) United States Patent
Cai et al.

(10) Patent No.: US 9,509,464 B2
(45) Date of Patent: Nov. 29, 2016

(54) FLEXIBLE OFDM/OFDMA FRAME STRUCTURE FOR COMMUNICATION SYSTEMS

(75) Inventors: Sean Cai, San Diego, CA (US); Jerry Chow, San Diego, CA (US); Hongyun Qu, Shenzhen (CN); Huiying Fang, Shenzhen (CN)

(73) Assignee: ZTE (USA) Inc., Austin, TX (US)

( * ) Notice: Subject to any disclaimer, the term of this patent is extended or adjusted under 35 U.S.C. 154(b) by 0 days.

(21) Appl. No.: 12/986,097

(22) Filed: Jan. 6, 2011

(65) Prior Publication Data

US 2011/0103406 A1 May 5, 2011

Related U.S. Application Data

(62) Division of application No. 12/267,502, filed on Nov. 7, 2008, now Pat. No. 8,204,025.

(60) Provisional application No. 60/986,809, filed on Nov. 9, 2007, provisional application No. 60/987,747, filed on Nov. 13, 2007, provisional application No. 61/020,690, filed on Jan. 11, 2008, provisional application No. 61/021,442, filed on Jan. 16, 2008, provisional application No. 61/031,658, filed on Feb. 26, 2008, provisional application No. 61/038,030, filed on Mar. 19, 2008.

(51) Int. Cl.
  *H04J 1/00* (2006.01)
  *H04L 5/00* (2006.01)
  *H04L 5/14* (2006.01)

(52) U.S. Cl.
  CPC .......... *H04L 5/0044* (2013.01); *H04L 5/1469* (2013.01); *H04L 5/0007* (2013.01); *H04L 5/0048* (2013.01); *H04L 5/0053* (2013.01); *H04L 5/0091* (2013.01)

(58) Field of Classification Search
  None
  See application file for complete search history.

(56) References Cited

U.S. PATENT DOCUMENTS

| | | | | |
|---|---|---|---|---|
| 5,867,478 A | * | 2/1999 | Baum et al. | 370/203 |
| 5,870,385 A | | 2/1999 | Ahmadi et al. | |
| 7,054,287 B2 | | 5/2006 | Mucke | |
| 7,570,626 B2 | * | 8/2009 | Murakami et al. | 370/343 |
| 7,620,021 B1 | | 11/2009 | Chen et al. | |
| 2005/0207335 A1 | * | 9/2005 | Schmidl et al. | 370/206 |
| 2006/0013182 A1 | | 1/2006 | Balasubramanian | |

(Continued)

FOREIGN PATENT DOCUMENTS

| | | |
|---|---|---|
| JP | H07-107546 | 4/1995 |
| JP | 2000-069550 A | 3/2000 |

(Continued)

OTHER PUBLICATIONS

Li et al., "TDD frame structure for 802.16m", Nov. 7, 2007, IEEE 802.16 Broadband Wireless Access Working Group, pp. 1-4.*

(Continued)

*Primary Examiner* — Steve Young
(74) *Attorney, Agent, or Firm* — Duane Morris LLP

(57) ABSTRACT

A flexible OFDM/OFDMA frame structure technology for communication systems is disclosed. The OFDM frame structure technology comprises a configurable-length frame which contains a variable length subframe structure to effectively utilize OFDM bandwidth. Furthermore, the frame structure facilitates spectrum sharing between multiple communication systems.

13 Claims, 19 Drawing Sheets

(56) References Cited

U.S. PATENT DOCUMENTS

| | | |
|---|---|---|
| 2006/0227778 A1* | 10/2006 | Jin et al. .................... 370/389 |
| 2007/0064669 A1 | 3/2007 | Classon et al. |
| 2007/0087691 A1* | 4/2007 | Lee ..................... H04B 7/155 |
| | | 455/13.2 |
| 2007/0121567 A1* | 5/2007 | Venkatachalam ....... H04L 5/023 |
| | | 370/343 |
| 2007/0195863 A1 | 8/2007 | Batra et al. |
| 2007/0217367 A1* | 9/2007 | Lee et al. .................... 370/335 |
| 2007/0281613 A1* | 12/2007 | Lee et al. ....................... 455/15 |
| 2008/0095108 A1 | 4/2008 | Malladi et al. |
| 2008/0107047 A1 | 5/2008 | Olfat |
| 2008/0137562 A1* | 6/2008 | Li ..................... H04B 7/2656 |
| | | 370/280 |
| 2009/0067377 A1 | 3/2009 | Talukdar et al. |
| 2009/0067448 A1 | 3/2009 | Stanwood et al. |
| 2009/0116374 A1* | 5/2009 | Henriksson et al. ......... 370/203 |
| 2009/0116435 A1 | 5/2009 | Koorapaty et al. |
| 2010/0020732 A1 | 1/2010 | Gaddam et al. |
| 2011/0103333 A1* | 5/2011 | Berggren et al. ............ 370/329 |

FOREIGN PATENT DOCUMENTS

| | | |
|---|---|---|
| JP | 2002-319917 A | 10/2002 |
| JP | 2001-177865 A | 6/2009 |
| JP | 2010-516164 A | 5/2010 |
| KR | 10-2007-0062530 | 6/2007 |
| WO | WO-2005/109705 A1 | 11/2005 |
| WO | WO 2006/105005 * | 10/2006 |
| WO | WO-2006/105005 A2 | 10/2006 |
| WO | WO 2007/005182 | 1/2007 |
| WO | WO 2007/080892 | 7/2007 |
| WO | WO 2009/062115 | 5/2009 |

OTHER PUBLICATIONS

International Search Report and Written Opinion for PCT/US2008/082906, mailed Jun. 9, 2009, 13 pages.

Kiran Thakare, et al; "An Evolved Frame Structure for IEEE 802.16m; IEEE C802.16m-07_235"; Nov. 7, 2007, pp. 1-5, URL, http://www.ieee802.org/16/tgm/contrib/C80216m-07_235.pdf.

Zexian Li, et al; "TDD frame structure for 802.16m; , IEEE C802.16m-07/215"; Nov. 7, 2007, pp. 1-4, URL, http://www.ieee802.org/16/tgm/contrib/C80216m-07_215.pdf.

Chow et al., "Base Frame Structure for IEEE 802.16m," *IEEE 802.16 Broadband Wireless Access Working Group*, Jan. 21, 2008, downloaded by European Patent Office on Mar. 3, 2011, 16 pages [BNS DOC ID No. XP17632311].

Extended European Search Report dated May 2, 2014, from related European Application No. 12155649.2, 14 pages.

Catt et al., "Cell Search procedure of EUTRA TDD system for the initial synchronization," *3GPP TSG RAN WG1 LTE Ad Hoc*, R1-060216, Jan. 23-25, 2006, Helsinki, Finland, 13 pages.

CMCC et al., "Way Forward on LTE TDD Frame Structure," *TSG-RAN WG1 #51*, R1-074762, Nov. 5-9, 2007, Jeju, Korea, 2 pages.

Office Action dated Feb. 23, 2015, from related Korean Patent Application No. 10-2010-7012670, 11 total pages.

Korean Intellectual Property Office Notice of Final Rejection in Korean Patent Application No. 10-2010-7012670, dated Feb. 29, 2016, with English Translation, in 9 pages.

* cited by examiner

FLEXIBLE OFDM/OFDMA FRAME STRUCTURE FOR COMMUNICATION SYSTEMS

RELATED PATENT APPLICATIONS

This application is a divisional of U.S. patent application Ser. No. 12/267,502 filed Nov. 7, 2008, which claims benefit of priority under 35 U.S.C. §119(e) to Provisional Application No. 60/986,809, entitled "Flexible OFDM/OFDMA Frame Structure For Communication Systems", filed Nov. 9, 2007; Provisional Application No. 60/987,747, entitled "Flexible OFDM/OFDMA Frame Structure For Communication Systems", filed Nov. 13, 2007; Provisional Application No. 61/020,690, entitled "Flexible OFDM/OFDMA Frame Structure For Communication Systems", filed Jan. 11, 2008; Provisional Application No. 61/021,442, entitled "Flexible OFDM/OFDMA Frame Structure For Communication Systems", filed Jan. 16, 2008; Provisional Application No. 61/031,658, entitled "Flexible OFDM/OFDMA Frame Structure For Communication Systems", filed Feb. 26, 2008; and Provisional Application No. 61/038,030, entitled "OFDM/OFDMA Frame Structure For Communication Systems", filed Mar. 19, 2008, all of which are incorporated by reference herein in their entirety.

FIELD OF THE INVENTION

The present invention relates generally to digital communications and more particularly to Orthogonal Frequency Division Multiplexing (OFDM) or Orthogonal Frequency Division Multiple Access (OFDMA) systems.

BACKGROUND OF THE INVENTION

There is an increasing need for mobile high-speed communication systems to provide a variety of services such as downloading music files, TV, Internet, and photo sharing. A mobile high-speed communication system must overcome many difficult operating conditions. Among the many conditions the system must contend with are interference, multipath signals, changing obstructions to the signal line-of-site, Doppler shift, inter-symbol interference (ISI), and changing distances between transmitter and receiver. Orthogonal Frequency Division Multiplexing (OFDM) is one technique developed for high-speed communications that can mitigate many of these difficult conditions.

OFDM divides an allocated communication channel into a number of orthogonal subchannels of equal bandwidth. Each subchannel is modulated by a unique group of subcarrier signals, whose frequencies are equally and minimally spaced for optimal bandwidth efficiency. The group of subcarrier signals are chosen to be orthogonal, meaning the inner product of any two of the subcarriers equals zero. An inverse fast Fourier transform (IFFT) is often used to form the subcarriers. The number of orthogonal subcarriers determines the fast Fourier transform (FFT) size (N) to be used.

Orthogonal Frequency Division Multiple Access (OFDMA) is a multi-user version of OFDM. For a communication device such as a base station (BS), multiple access is accomplished by assigning subsets of the orthogonal sub-carriers to individual subscriber devices, such as mobile stations (MS), with which the base station is communicating. OFDMA may be considered to be a combination of frequency and time domain multiple access, where a time-frequency space is partitioned and the mobile station data is assigned along the OFDM symbols and subcarriers.

In telecommunications, a frame is a fixed or variable length packet of data, encoded in accordance with a communication protocol for digital transmission. A frame structure defines the way a multiplexer divides a communication channel into frames for transmission. The frame structure of an OFDM or OFDMA system has a major impact on the performance of the system. Currently, there is limited choice for high performance OFDM and OFDMA frame structures. Therefore, there is a need for systems and methods that provide a flexible frame structure for high performance OFDM and OFDMA systems.

In particular, the 802.16e amendment to the IEEE 802.16 standard, which is referred to as "802.16e" or simply as "16e" herein, has defined a relatively rigid frame structure in accordance with the WirelessMAN-OFDMA Reference System. A new amendment to the IEEE 802.16 standard, the 802.16m amendment, which is referred to as "802.16m" or simply as "16m" herein, has been proposed. Requirements for the development of the 802.16m as specified by IEEE 802.16m System Requirements Document (IEEE 802.16m SRD), IEEE 802.16m-07/002r4, Oct. 19, 2007, which is incorporated by reference herein in its entirety, stipulate many improvements in performance over the 802.16e WirelessMAN-OFDMA Reference System and operation in many different deployment environments. Improvements in performance include reductions in latency across the air interface, increases in user and sector throughput, and reductions in system overhead. Operation is also required in the presence of varying levels of mobility, from stationary up to 350 km/h and beyond, and in sectors and cells with drastically different coverage ranges, from micro-cells and even femto-cells with coverage ranges in the 10's to 100's meters to large rural macro-cells with coverage ranges greater than 5 kilometers.

The relatively rigid frame structure that currently exists in IEEE 802.16e operating with the OFDMA physical layer is unlikely to maximize the achievable performance under such diverse deployments and operational conditions. Therefore, there is a need for a more flexible frame structure that allows maximal performance to be more readily achieved under the given deployment and operational conditions.

An added constraint on the system design of IEEE 802.16m is the requirement to support legacy Mobile Stations (MS) that conform to IEEE 802.16e WirelessMAN-OFDMA Reference System on the same radio frequency carrier simultaneously with IEEE 802.16m MSs. In this mixed mode of operation, the legacy MSs must be able to operate as if they were being served by a Base Station (BS) that conforms only to the WirelessMAN-OFDMA Reference System. Therefore, there is also a need for an IEEE 802.16m frame structure that provides support for legacy MSs under IEEE 802.16e.

SUMMARY OF THE INVENTION

A flexible OFDM/OFDMA frame structure for communication systems is disclosed. The OFDM frame structure comprises a configurable-length frame which contains a variable length subframe structure to effectively utilize OFDM bandwidth. Furthermore, the frame structure facilitates spectrum sharing between multiple wireless communication systems.

In one embodiment of the invention, the OFDM/OFDMA frame structure is comprised of a time series of successive fixed length frames with each frame subdivided into one or more variable length subframes and with each subframe being an integer number of a unit subframe in duration. While the durations of the frames, $T_{frame}$, and unit subframes, $T_{u\text{-}sub}$, are fixed for a particular instantiation of the OFDM/OFDMA frame structure, they may take on different values for different instantiations of the OFDM/OFDMA frame structure. Example frame durations may be $T_{frame}$=5, 10, and 20 ms. Example unit subframe durations may be $T_{u\text{-}sub}$=0.5, 0.675, 1, 1.25, 1.5, and 2 ms. This flexibility in configuration of frame durations and unit subframe durations facilitate the co-existence of current and future systems based on current and future industry standards such as Third Generation Partnership Project Long Term Evolution (3GPP LTE), Third Generation Partnership Project 2 Ultra Mobile Broadband (3GPP2 UMB), Time Division-Synchronous Code Division Multiple Access (TD-SCDMA), Wireless Interoperability for Microwave Access (WiMAX), and the like.

In another embodiment of the invention, the start of an OFDM/OFDMA frame is identifiable by the presence of a Frame Sync and Control signal that is transmitted on the downlink at the start of the first subframe of the frame. The Frame Sync and Control signal possesses properties that distinguish this start of frame transmission from similar transmissions, such as transmissions from other sources within this OFDM/OFDMA system or from systems of other Time Division Multiplexed (TDM) based transmission technologies that are sharing the same transmission medium (e.g., same radio frequencies), such as Wireless Interoperability for Microwave Access (WiMAX).

In another embodiment of the invention, the Frame Sync and Control signal that is located at the start of the OFDM/OFDMA frame contains control information that a compatible device can receive and decode to determine the subframe structure within the frame. This frame control information flexibly supports specification of subframes with durations and directions (i.e., downlink or uplink) that can vary within a frame and also from frame to frame. This flexibility allows the OFDM/OFDMA frame structure to be adapted to accommodate dynamic Quality of Service (QoS) and system control requirements of the data being carried across the OFDM/OFDMA air interface.

In another embodiment of the invention, one or more subframes within a frame can be set aside for use by transmissions from other sources, such as other sources within the same OFDM/OFDMA system, or from systems of other Time Division Multiplexed (TDM) based transmission technologies that are sharing the same transmission medium (e.g., same radio frequencies), such as Wireless Interoperability for Microwave Access (WiMAX). The flexibility in the configuration of the frame and unit subframe durations, and of the dynamic subframe durations within frames allows the TDM timing and framing requirements of other technologies to be easily accommodated.

In another embodiment of the invention, areas of the time-frequency physical transmission resource space in one or more subframes within a frame can be set aside for use by transmissions from other sources, such as other sources within the same OFDM/OFDMA system, or from systems of other Time Division Multiplexed (TDM) based transmission technologies that are sharing the same transmission medium (e.g., same radio frequencies), such as Wireless Interoperability for Microwave Access (WiMAX). This approach is advantageous when the other transmission sources occupy only a subset of the transmission frequencies of the primary source (i.e., the transmitter of the Frame Sync and Control signal for this OFDM/OFDMA frame structure).

In yet another embodiment of the invention, a method is described for defining an IEEE 802.16m proposed standard (16m) frame structure with legacy support for IEEE 802.16e standard (16e) frame requirements. The method adds flexibility to allow frame partitioning and timing to fit legacy 16e frame requirements. The method may start with a frame design tailored to meet 16m requirements (e.g., shorter delay, lower control overhead, etc.), and then fit legacy 16e frames and subframes into the 16m frame structure by appropriate resource reservation.

In another embodiment of the invention, the frame is further divided into Frame Partitions where each Frame Partition contains local control information for the partition located at some known location within the partition, and where the location of the start of the partition is pointed to by the control information in the previous partition. The local control information within the Frame Partition contains frame control information applicable to the partition, which at a minimum includes the location, size and direction of subframes within the partition, and may include the location and size of data transmission allocations within the subframes as well as other types of broadcast control information for the partition.

In another embodiment of the invention, control information in a primary carrier provides control of transmissions and resource allocations in a secondary carrier. This secondary carrier may or may not be adjacent to the primary carrier, and the resources of one or more of these secondary carriers together with the resources of the primary carrier constitute the available resources for the Base Station (BS).

In another embodiment of the invention, all subframes of the primary carrier are for the downlink direction (from BS to MS) and all subframes of a secondary carrier are for the uplink direction (from MS to BS), which represents a special case of the frame structure configuration described herein that can be applied to a Frequency Division Duplex (FDD) arrangement of carriers belonging to a BS.

In another embodiment of the invention, the physical layer of an OFDM/OFDMA communication system is based on a fixed subcarrier spacing of 12.5 kHz. The 12.5 kHz subcarrier spacing is applied for all the channel bandwidth, e.g., 5/10/20 MHz, 3.5/7/14 MHz and also 8.75 MHz. The 12.5 kHz subcarrier spacing serves well in all the radio environments that 802.16m is intended to operate in, and is highly compatible with available and potential future carrier bandwidths.

In another embodiment of the invention, three cyclic prefix (CP) lengths based on the 12.5 kHz subcarrier spacing are provided and used for different radio scenarios. These three CP lengths are needed to adequately balance the required length of CP with the loss of capacity due to the CP in order to serve the breadth of radio environments envisaged for 802.16m. The three CP lengths are 2.5 us, 10 us, and 15 us.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following Figures. The drawings are provided for purposes of illustration only and merely depict exemplary embodiments of the invention. These drawings are provided to facilitate the reader's understanding of the invention

DETAILED DESCRIPTION OF EXEMPLARY EMBODIMENTS

Figure 1:
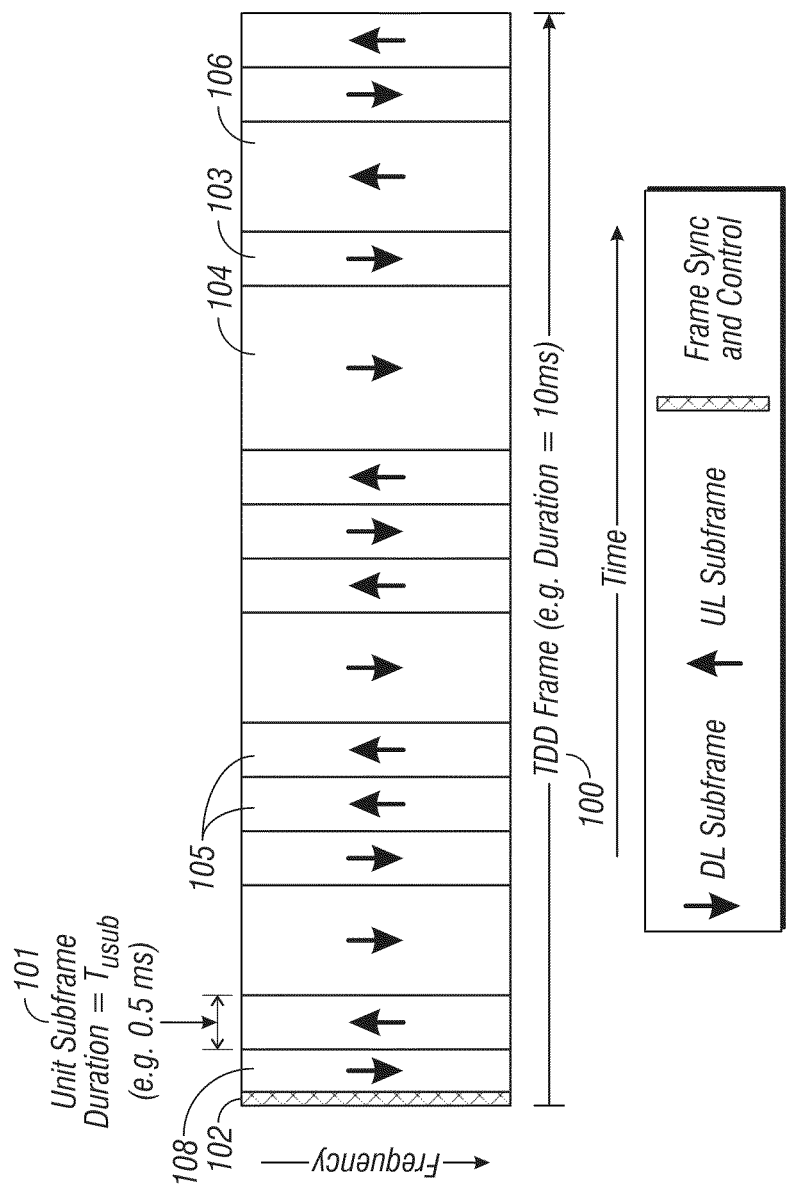
FIG. 1 illustrates a general TDD frame structure according to one embodiment of the invention.

In the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the preferred embodiments of the invention.

The present invention is directed toward systems and methods for OFDM/OFDMA frame structure technology for communication systems. Embodiments of the invention are described herein in the context of one practical application, namely, communication between a base station and a plurality of mobile devices. In this context, the example system is applicable to provide data communications between the base station and the plurality of mobile devices. The invention, however, is not limited to such base station and mobile device communications applications, and the methods described herein may also be utilized in other applications such as mobile-to-mobile communications, wireless local loop communications, wireless relay communications, or wireless backhaul communications, for example.

In order to provide the most flexibility to meet the requirement of current and future systems, the basic frame definition in accordance with embodiments of the present invention may include five elements in hierarchical order: frame; frame partition; subframe; subframe partition; and unit subframe. Each of these five frame elements will be described below.

A frame provides the main outer structure that governs how quickly MSs can acquire synchronization with the frame boundaries and begin communications with a BS. Therefore, a frame is primarily characterized by a length, the presence of a synchronization signal, which is typically a Preamble at the beginning of the frame, and control information that pertains to the frame.

The frame length is therefore set as a tradeoff between how quickly MSs can acquire or re-acquire synchronization and how often the overhead of the frame synchronization and control information is incurred. Considerations for synchronization delay include time to begin or re-acquire communications with a BS, such as on initial network entry or on recovery after synchronization loss, or time to perform rudimentary signal measurements on the BS, such as during neighbor scanning to support handover.

A frame partition is a sub-slice of the frame that provides a shorter timeframe for scheduling relevance. This means that decisions on radio resource structures and assignments for a frame partition are made at the beginning of the frame partition and generally cannot be altered. These are communicated to MSs via the Frame Partition Control signaling that appears at the beginning of the frame partition.

A frame partition is comprised of one or more subframes, where the first subframe must be a DL subframe in order to accommodate the Frame Partition Control signaling.

The length of a frame partition is generally dynamically set on a frame partition by frame partition basis based on the available queued DL traffic and outstanding UL data requests and the available DL and UL radio resources in the next subframes in the frame, although if the available locations within a frame where a frame partition may begin are based on fixed locations where frame partition control signaling may be located, the available lengths of frame partitions may also be constrained accordingly. In this way, the scheduling horizon and the frequency of Frame Partition Control signaling adapts with the traffic load (i.e., becomes longer and less frequent as the traffic load increases). The maximum length of a frame partition is governed by the maximum tolerable delay for emergency signaling and may become relevant if the maximum length is shorter than the length of a frame. There are one or more frame partitions in a frame.

A subframe is defined as a contiguous number of time units of radio resources within a frame that has the same direction property—i.e., either downlink or uplink. Therefore, a subframe is characterized by two parameters: 1) a direction (downlink or uplink) and 2) a length or duration. This definition essentially retains the definition of subframe from the WirelessMAN-OFDMA Reference System except that there may be two consecutive subframes that possess the same directionality (e.g. downlink subframe followed by another downlink subframe) if the subframes belong to different frame partitions.

The granularity with which the length of subframes can be set is governed by the unit subframe since a subframe contains an integer number of unit subframes, with the minimum length being 1 unit subframe and the maximum length being governed by the length of the frame partition in which the subframe belongs.

Since the length of subframes govern the rate of change of link direction in TDD operation, the subframe configuration has a direct impact on air interface transfer latency and therefore, on QoS and on signaling response latency.

A subframe is comprised of one or more subframe partitions. Different subframe partitions may operate with different physical layer settings that may be better suited for communications with a certain set of MSs. This is analogous to the concept of permutation zone of the WirelessMAN-OFDMA Reference System, but with an important distinction since there may be other parameters that can be set differently between subframe partitions than subcarrier permutations. A subframe partition is comprised of one or more unit subframes of identical or compatible configurations, and therefore, is an integer number of unit subframes in length.

The number and lengths of subframe partitions are set on a subframe by subframe basis based on what may be the best configuration for the MSs and traffic being serviced at a particular time. A subframe partition is characterized by a length and properties of its constituent unit subframe(s).

The radio resource allocation for a specific burst transmission may be comprised of a set of one or more individually addressable radio resource allocable units from within the unit subframes of a subframe partition. Burst transmissions do not occur across subframe partition boundaries.

A unit subframe is defined as a continuous time interval of radio resources across the entire bandwidth (i.e., all subcarriers) of a radio carrier that possesses a particular physical-layer structure, such as pilot and data subcarrier organization, radio resource allocation structure, OFDM symbol structure, and idle time length and location. Units of radio resource allocations by the Medium Access Control (MAC) are defined within the boundaries of a unit subframe and therefore, a unit subframe also represents the largest individually addressable radio resource allocable unit. A unit subframe may be subdivided into smaller units of radio resources that are individually addressable, but individually addressable radio resource allocable units do not cross unit subframe boundaries. Alternatively, radio resource allocable units and therefore, correspondingly the address space for radio resource allocations may be defined within the span of a subframe partition.

The nature of the physical layer parameter settings that may be set on a unit-subframe basis is a topic for further study and will be governed by the possible physical layer radio resource configurations to be defined. A unit subframe is comprised of one or more (typically several) contiguous OFDM symbol periods and one or more idle times across all subcarriers of radio carrier.

The unit subframe is the smallest time-unit building block of the frame structure.

A frame structure that includes all the five elements described above provides the most flexibility to meet the requirement of current and future systems. However, in alternative embodiments, one or more frame elements might be eliminated to reduce frame control overhead and to improve the performance of a particular system.

FIG. 1 is an illustration of an exemplary OFDM/OFDMA frame operating in Time Division Duplex (TDD) mode in accordance with one embodiment of the invention.

The OFDM/OEDMA TDD frame definition 100 includes: a frame duration ($T_{frame}$) 100, a Frame Sync and Control signal 102, one or more downlink subframes 103 and 104 of varying durations, and one or more uplink subframes 105 and 106 of varying durations. A subframe comprises an integer number of unit subframe durations ($T_{u-sub}$) 101. Adjacent subframes may provide communications in the same direction, such as 105 and 103/104, or may provide communications in opposite directions, such as 103/106. The first subframe 108 is a downlink subframe and contains the Frame Sync and Control signal 102.

The frame sync signal within the Frame Sync and Control signal 102 is generally a signal with unique known properties that allow it to be easily distinguishable from other signals in the frame and from frame sync signals of other transmission sources that may be using the same transmission medium (e.g., the same radio frequencies). Equivalently, the frame sync signal exhibits strong autocorrelation properties (that is, values of its autocorrelation function have a distinctive peak when the signal is compared to an aligned copy of itself) and weak cross-correlation properties with other signals in the frame or with other frame sync signals of other transmission sources that may be using the same transmission medium. Besides its property of uniqueness, the frame sync signal commonly also possesses other useful properties that assist the receiver to properly demodulate and decode the other control and data signals within the frame. Being located at the start of the frame, the frame sync signal in the Frame Sync and Control signal shown in FIG. 1 is generally known as a Preamble of the frame.

Figure 2:
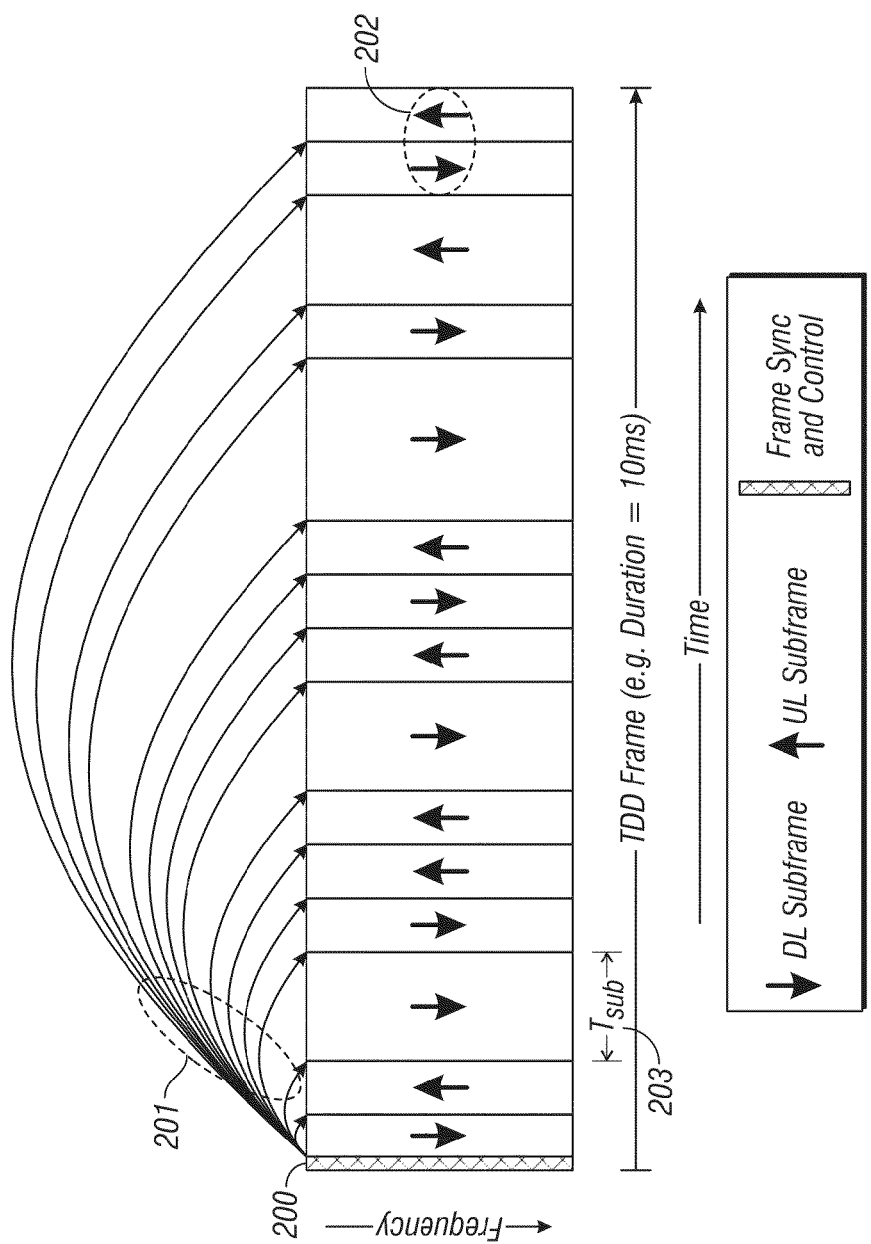
FIG. 2 illustrates an exemplary method of frame control according to one embodiment of the invention.

FIG. 2 is an illustration of an exemplary method of control of the subframe structure of a frame according to an embodiment of the invention. In this method, the Frame Sync and Control signal 200 defines the subframe structure of the entire frame. This subframe structure definition includes at least the following control information: 1) pointers 201 to the time location of the start of each subframe within the frame, 2) the directionality 202 of each subframe (i.e., whether the subframe is used for downlink or uplink transmissions), and 3) the time duration $T_{sub}$ 203 of each subframe.

The subframe pointers 201 may be implemented in a number of ways. One implementation is as a time offset from a known time reference point, such as from the start of the frame. There are also several options for the time unit in which the subframe time offset is expressed, such as in terms of a clock-based time unit (e.g., microseconds or milliseconds) or in terms of the duration ($T_{u-sub}$) of the unit subframe. Since each subframe is defined to be an integer number of unit subframes, expressing the duration of a subframe in terms of the number of unit subframes is the most efficient since this results in the minimum number of information bits needed to express the subframe duration. Therefore, the time offset to the start of each subframe in the frame can be expressed as an integer number of unit subframes from the start of the frame.

As a refinement to this method, a more optimal way to define the start of each subframe is to combine it with the specification of the durations of subframes by arranging the durations as a vector in which the subframe durations are listed in their order from the start of the frame. With this refined method, the time offset from the start of the frame to the start of a subframe within the frame is the sum of the durations of all of the intervening subframes from the start of the frame to that subframe. With reference to the vector organization of the durations of the subframes within a frame, the time offset to the n$^{th}$ subframe may be expressed as:

$$T_{offset\text{-}sub}[n] = \sum_{i=1}^{n-1} T_{sub}[i].$$

The subframe directionality 202 can take on one of two values (i.e., downlink or uplink) and thus, can be represented by 1 bit of control information per subframe. This subframe direction control bit may be grouped together with the other attributes of each subframe or may be organized as a vector of subframe direction control bits indexed in the order of subframe starting from the 1$^{st}$ subframe at the beginning of the frame. These are examples of ways of organizing the subframe direction control information within a frame; other ways are possible. In order to reduce control signaling overhead at the expense of frame structure flexibility, the applicable frame structure may be selectable from a set of predefined settings in which the positions, lengths and directionalities of subframes within a frame would not need to be individually signaled.

Figure 3:
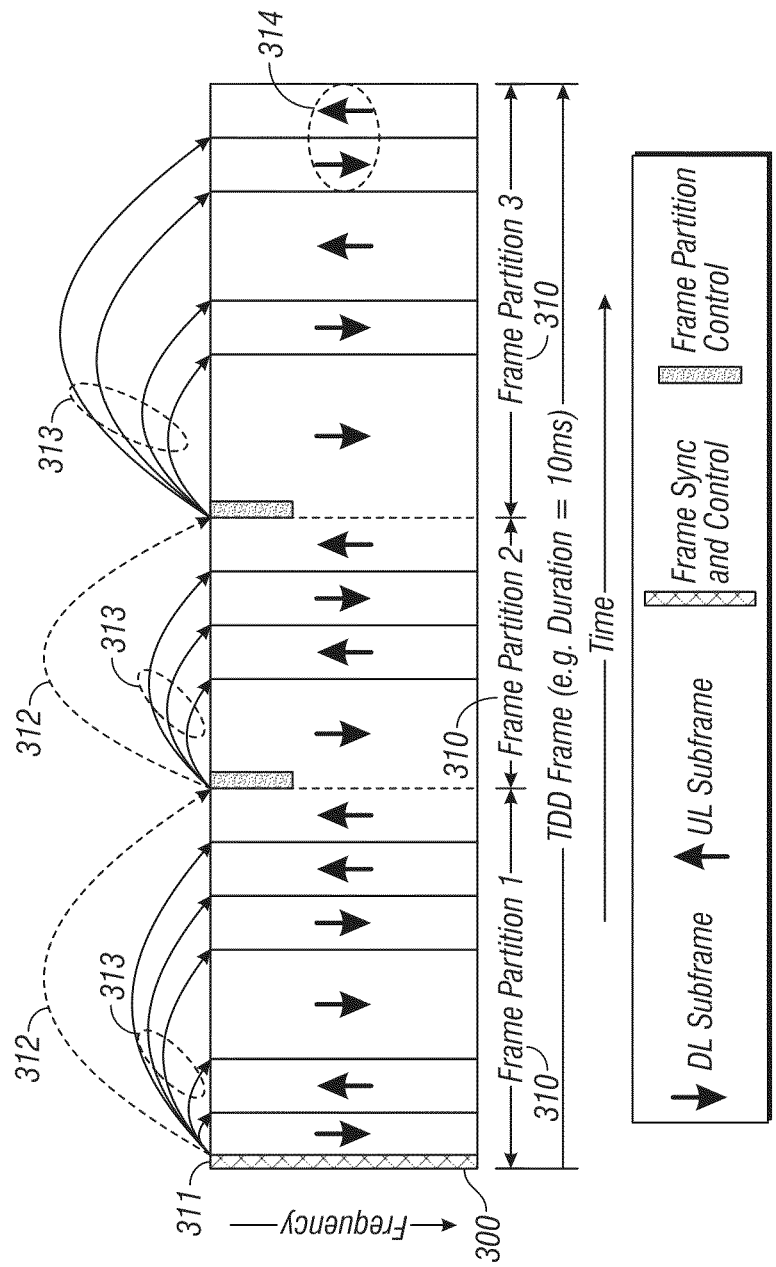
FIG. 3 illustrates another exemplary method of frame control according to one embodiment of the invention.

FIG. 3 is an illustration of another exemplary method of control of the subframe structure of a frame according to an embodiment of the invention. In this method, consecutive subframes within a frame are grouped into Frame Partitions 310. A frame may be comprised of a one or more Frame Partitions and the Frame Partitions may be of different durations. A Frame Partition provides more localized control of subframe structure within a frame. Another benefit of Frame Partitions is the flexibility to shorten the scheduling window to timeframes that are shorter than the duration of a frame, which can benefit the scheduling of time-critical traffic.

A Frame Partition 310 is comprised firstly of a downlink subframe which contains a Frame Partition Control data block 311 that is situated at a known location in the subframe (for example, located at the upper left corner of the frequency-time space of this first downlink subframe within a Frame Partition as shown in FIG. 3). Following the first downlink subframe, there may be 0 or more other subframes of varying durations and various directionalities that comprise the Frame Partition. The maximum duration of any Frame Partition is constrained by the number of unit subframe times remaining from the start of the Frame Partition to the end of the frame.

The Frame Partition Control 311 defines the subframe structure of the Frame Partition. This subframe structure definition includes at least the following control information: 1) pointers 313 to the time location of the start of each subframe that follows the first downlink subframe within the Frame Partition, 2) the directionality 314 of each subframe (i.e., whether the subframe is used for downlink or uplink transmissions) that follows the first downlink subframe within the Frame Partition, 3) the time duration T$_{sub}$ 315 of each subframe, and 4) a pointer 312 to the start of the next Frame Partition in the frame. If the structure of a frame is selected from a predefined set, the locations, durations and directionalities of the subframes within the frame partition are implicit by the location of the start of the frame partition within the frame, and therefore, would not need to be explicitly signaled.

The subframe pointers 313 may be implemented in a number of ways. One implementation is as a time offset from a known time reference point, such as from the start of the Frame Partition. There are also several options for the time unit in which the subframe time offset is expressed, such as in terms of a clock-based time unit (e.g., microseconds or milliseconds) or in terms of the duration (T$_{u\text{-}sub}$) of the unit subframe. Since each subframe is defined to be an integer number of unit subframes, expressing the duration of a subframe in terms of the number of unit subframes is the most efficient since this results in the minimum number of information bits needed to express the subframe duration. Therefore, the time offset to the start of each subframe in the Frame Partition can be expressed as an integer number of unit subframes from the start of the Frame Partition.

As a refinement to this method, a more optimal way to define the start of each subframe is to combine it with the specification of the durations of subframes by arranging the durations as a vector in which the subframe durations are listed in their order from the start of the Frame Partition. With this refined method, the time offset from the start of the Frame Partition to the start of a subframe within the Frame Partition is the sum of the durations of all of the intervening subframes from the start of the Frame Partition to that subframe. With reference to the vector organization of the durations of the subframes within a Frame Partition, the time offset to the n$^{th}$ subframe may be expressed as:

$$T_{offset\text{-}sub}[n] = \sum_{i=1}^{n-1} T_{sub}[i].$$

The subframe directionality 314 can take on one of two values (i.e., downlink or uplink) and thus, can be represented by 1 bit of control information per subframe. This subframe direction control bit may be grouped together with the other attributes of each subframe or may be organized as a vector of subframe direction control bits indexed in the order of subframe starting from the 1$^{st}$ subframe at the beginning of the Frame Partition. These are examples of ways of organizing the subframe direction control information within a Frame Partition; other ways are possible.

The pointers 312 that are located in the Frame Partition Control information in each Frame Partition and that specifies the time location of the start of the next Frame Partition may be implemented in a number of ways. One implementation is as a time offset from a known time reference point, such as from the start of the Frame Partition. If the time unit used to specify this time offset is in terms of the duration (T$_{u\text{-}sub}$) of the unit subframe, the time offset to the start of the next Frame Partition can be expressed as an integer number of unit subframes from the start of this Frame Partition. For the last Frame Partition in the frame, the pointer 312 contains a suitable unique value to indicate that there is no further next Frame Partition within the frame.

In the method of FIG. 3, the frame control information contained in the Frame Sync and Control signal 300 includes information that applies to an entire frame basis. Such information may include the duration of the frame, the number of Frame Partitions in the frame, the unit subframe duration $T_{u\text{-}sub}$, any restrictions on which subcarriers in the OFDM/OFDMA signal is valid within the frame, and so on.

Figure 4:
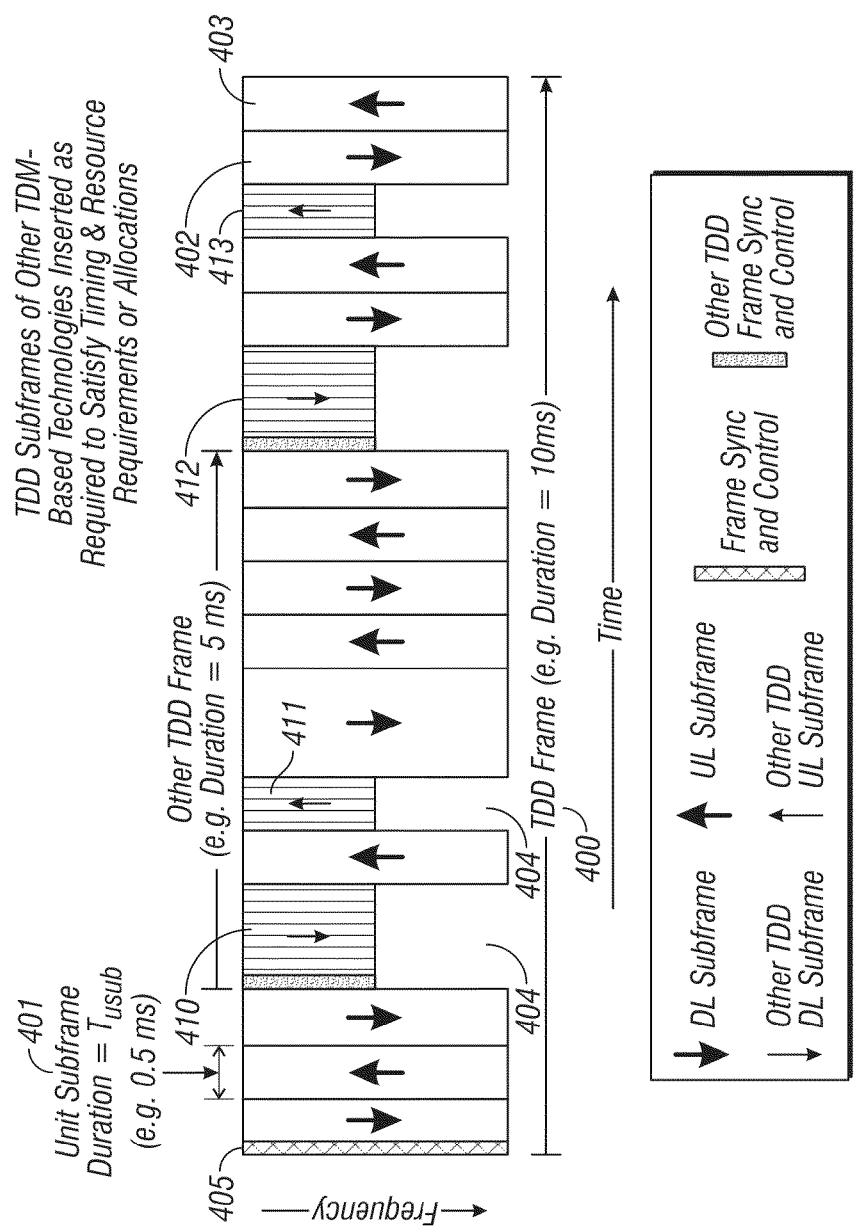
FIG. 4 illustrates an exemplary method of spectrum sharing with other TDM-based transmission technologies according to one embodiment of the invention.

FIG. 4 is an illustration of an exemplary method for the support of spectrum sharing with another system based on other Time-Division-Multiplexed (TDM) based transmission technologies according to an embodiment of the invention. With the flexibility allowed in the settings of the unit subframe duration $T_{u\text{-}sub}$ 401 and the frame duration 400, spectrum sharing in a time division multiplexed fashion can be easily accommodated supporting the other technology's requirements in terms of frame and subframe timing as applicable. The only requirement on the other technology is that it not require full use of its operating spectrum at all times.

In this spectrum sharing method, certain subframe durations 404 within a frame may be reserved for the other system's use. Those subframe durations are managed within the current system such that there are no transmissions, downlink or uplink, by the current system during those times. This means that these reserved subframe durations require special designation within the current system. There are many ways in which this designation can be accomplished. One exemplary method of designating these reserved subframe durations is to define them in the normal manner in which subframes of the current system are defined, such as according to methods described above, and to enhance the definition of the subframe directionalities as described above to include a new state value that indicates directionality does not apply to this subframe and thereby indicating that the particular subframe time is not used by the current system.

The subframe durations 404 reserved for other-system use follow the same policies as durations of subframes active within the current system. Specifically, these durations are defined as integer multiples of the unit subframe duration 401.

There is no restriction that the physical parameters of the transmissions in the subframes of the current system and in the subframes durations reserved for the other system be the same. Examples of physical transmission parameters that may differ include but are not restricted to OFDM/OFDMA sub-carrier spacing, symbol time, and cyclic prefix (CP) duration.

In the example shown in FIG. 4, the other system operates with a channel bandwidth that is half of the bandwidth of the current system. As can be easily seen from FIG. 4, there is no restriction in terms of the bandwidth needed by the other system relative to the bandwidth used by the current system; the bandwidth of the other system may be smaller, equal to, or larger than the bandwidth of the current system.

In the example shown in FIG. 4, the other system operates with a channel with its center offset from the center frequency of the channel used by the current system. As can be easily seen from FIG. 4, there is no restriction in terms of the relative centering of the channel bandwidth used by the other system and the center of the channel bandwidth used by the current system; the center of the channel bandwidth used by the other system may be above, the same as, or below the center of the channel bandwidth used by the current system. There is also no restriction that the channel bandwidth used by the other system fall entirely within the channel bandwidth of the current system; there may be any part of the channel bandwidth of the other system that falls outside the bounds of the channel bandwidth used by the current system.

In the example of FIG. 4, the other system is a TDD system that operates with alternating downlink subframes, 410 and 412, and uplink subframes, 411 and 413, with a frame comprising exactly one downlink subframe followed by one uplink subframe with frame duration of 5 ms. As can be easily seen, the directionality of transmission by the other system within reserved subframe durations is not significant to the allocation requirements for the reserved subframe durations within the current system. The pertinent information of the other system includes the minimum periodicity of the reserved subframes and if applicable, any relative timing requirements between multiple reserved subframes within this minimum period. The periodicity of reserved subframes required by the other system is defined in terms of the interval between two reference reserved subframe durations, as represented by reserved subframe durations 410 and 412 in FIG. 4. The frame time of the current system should be selected as an integer multiple of the minimum period of reserved subframe durations required by the other system. In this way, the relative positions of the reserved subframe durations within the frame time of the current system remain fixed, thereby avoiding any issues with reserved subframe durations conflicting with any periodic frame control information required by the current system. Given this guideline for the setting of the frame duration of the current system relative to the periodicity requirements of reserved subframes of the other system, one can see that the choice of a 10-ms frame duration for the current system in the example of FIG. 4 given that the reserved subframe durations for the other system are repetitive at a 5-ms interval is a suitable choice; the reserved subframe durations for downlink subframes of the other system remain at the same relative positions within the 10-ms frame of the current system and thereby help avoid any contention between the reserved subframe durations for the other system and the Frame Sync and Control signal 405 at the beginning of the 10-ms frame of the current system. As can be seen from the example of FIG. 4, some variability can be accommodated in the relative intervals between other reserved subframes, 411 and 413, that fall between the reference reserved subframes, 410 and 412, and these reference reserved subframes.

Figure 5:
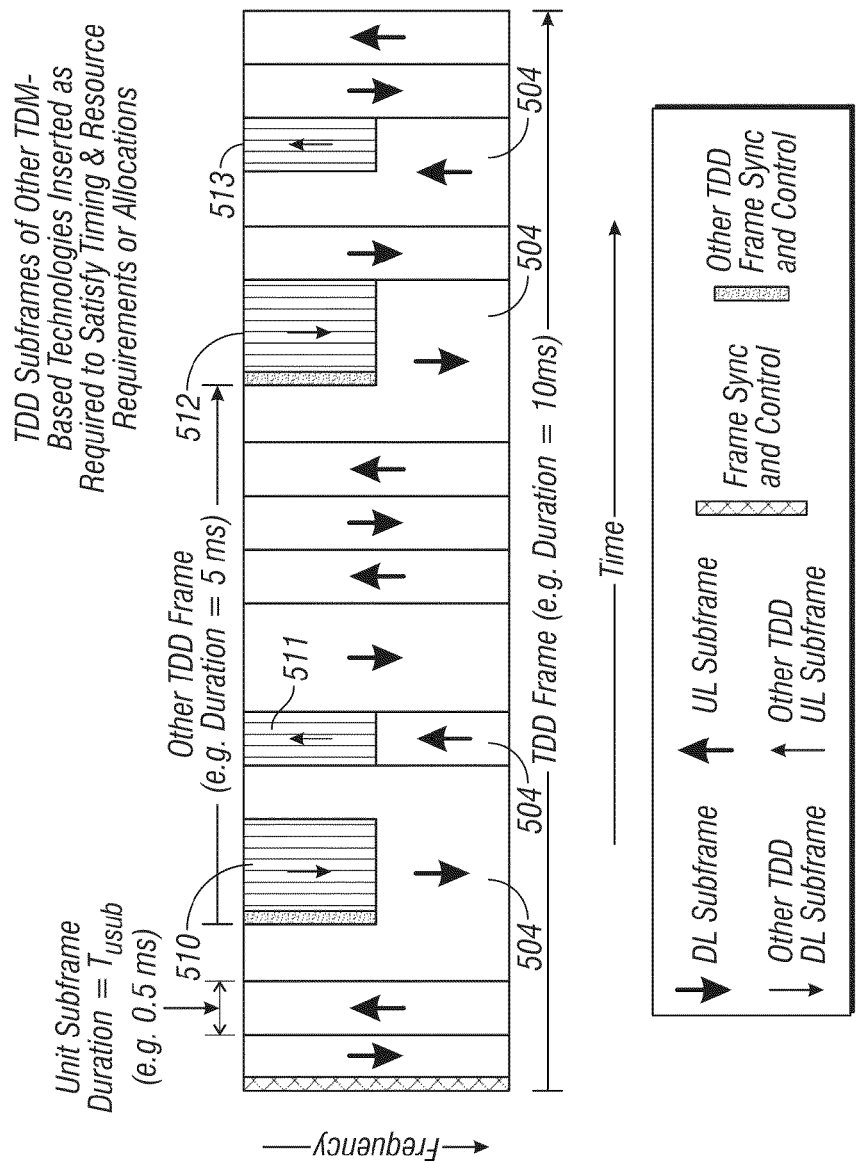
FIG. 5 illustrates another exemplary method of spectrum sharing with other TDM-based transmission technologies according to one embodiment of the invention.

FIG. 5 is an illustration of another exemplary method for the support of spectrum sharing with another system based on other Time-Division-Multiplexed (TDM) based transmission technologies according to an embodiment of the invention. This method is most applicable to scenarios in which the other system requires reservation of a channel bandwidth that does not fully overlap with the channel bandwidth of the current system, thereby not requiring the entire bandwidth of the current system to be reserved for the other system when required. This method only applies when the current system is based on OFDMA technology since OFDMA technology can make use of a subset of the sub-carriers at any time.

It is noted firstly that the method of FIG. 5 is similar in many respects to the basic method of spectrum sharing of FIG. 4 and that have already been described in connection with the description of that method. Therefore, the method of FIG. 5 is only described with respect to those aspects in which it is different from the basic method of FIG. 4.

As shown in FIG. 5, this method utilizes the concept of physical resource allocation based on a rectangular area within the two-dimensional OFDMA signal—the two dimensions being time and frequency. Such a physical resource allocation is often known as an OFDMA region.

One aspect of the system is the ability to allocate OFDMA regions of varying lengths in both the time and frequency dimensions in both downlink and uplink subframes. The edges of the rectangular OFDMA region are confined to fall within the frequency and time boundaries of a subframe.

One difference between the basic spectrum sharing method of FIG. 4 and the more flexible method of sharing of FIG. 5 is that the reserved resources for the other system is defined in terms of subframe durations in the basic method whereas the reserved resources for the other system is defined in terms of OFDMA regions in the more flexible method. Therefore, in the more flexible method, the current system is allowed to make use of any sub-carriers of the OFDMA signal that are not required by the other system during those intervals in which reservations of sub-carriers are required for the other system. Another way to state this difference is that the reserved areas for the other system in the basic method appear as separate subframes within the current system whereas the reserved areas in the more flexible method appear as OFDMA regions within subframes of the current system. This latter characteristic of the more flexible method is shown in FIG. 5 where the OFDMA regions (510, 511, 512, 513) that are reserved for the other system are situated within subframes 504 within the current system.

Similarly to the basic method in FIG. 4, the more flexible method in FIG. 5 also has no restriction that the channel bandwidth used by the other system falls entirely within the channel bandwidth of the current system; any part of the channel bandwidth of the other system may fall outside the bounds of the channel bandwidth used by the current system. In this latter case, the size of the OFDMA region reserved for the other system is determined by the amount of overlap of the channel bandwidth of the other system with the channel bandwidth of the current system.

Special placement considerations may be required if the reserved OFDMA region for the other system falls within a downlink subframe within the current system. This is due to the possibility of subframe control information being present within the subframe. If present, this subframe control information typically resides at the front (earliest time) of the subframe. If this is applicable, the reserved OFDMA regions for the other system must not be situated at the front of downlink subframes for the current system. This consideration is shown in FIG. 5 where the reserved OFDMA regions 510 and 512 for the other system are not situated within the first unit subframe time in downlink subframes.

Figure 6:
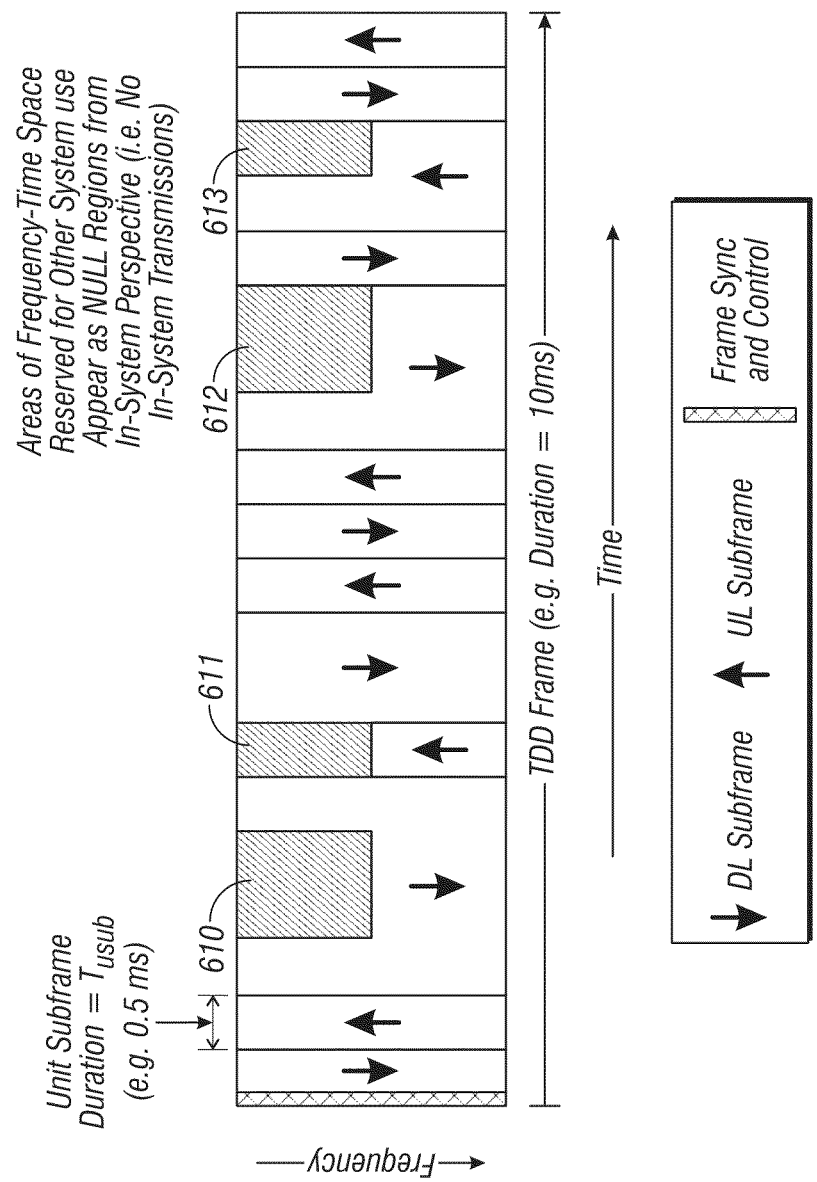
FIG. 6 illustrates another aspect of the exemplary method of spectrum sharing in FIG. 5 according to one embodiment of the invention.

FIG. 6 provides a view of the frame for the same example scenario as FIG. 5 but from the perspective of the current system only. The figure shows that the reserved OFDMA regions for the other system appear as NULL regions in the current system, a NULL region being a frequency-time area where there are no transmissions, uplink or downlink, from the current system.

Figure 7:
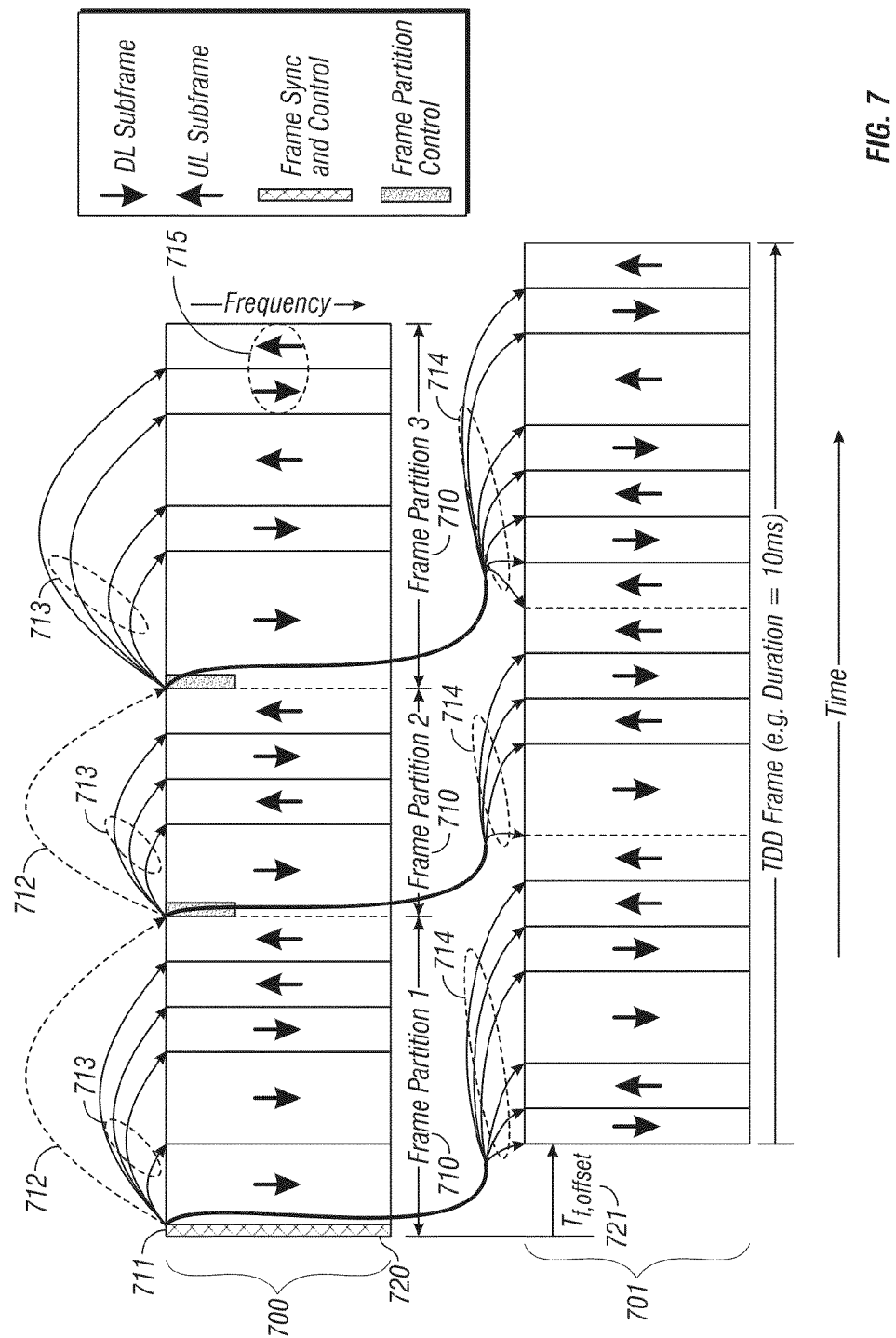
FIG. 7 illustrates an exemplary method of frame control of a secondary carrier from a primary carrier according to one embodiment of the invention.

FIG. 7 illustrates how the method of frame control based on Frame Partitions as described above can be simply extended to support a scenario where one or more secondary carriers are also assigned as resources available to the BS for communications over the air interface. A secondary carrier 701 may or may not be adjacent to the primary carrier 700, and the resources of one or more of these secondary carriers together with the resources of the primary carrier constitute the available resources for the Base Station (BS).

In the extended method for multi-carrier support of FIG. 7, control information exists only on the primary carrier 700. Besides the minimum control information already described above for the primary carrier 700, an additional set of control information 714 provides control of transmissions and resource allocations in Frame Partitions located on a secondary carrier. At a minimum, each set of Frame Partition control information 714 for a secondary carrier includes the location and size of the secondary carrier, such as in terms of center frequency and bandwidth, respectively, or alternatively summarized by an Identifier for the secondary carrier where the location and size information for the secondary carrier have been previously associated with such Identifier, the locations, size and directionality of each subframe with considerations for such information being the same as for the primary carrier 700 as discussed above, and the location, sizes and MS assignments of data transmissions for downlink subframes and resources for UL data transmissions for uplink subframes.

Also in the extended method for multi-carrier support of FIG. 7, a parameter $T_{f,offset}$ 721 is introduced that represents a time delay introduced between the start of Frame Partitions on a secondary carrier and the associated Frame Partitions primary carrier. Such offset represents time allowed for the MS to receive and process the Frame Partition control information for the secondary carrier 714 from the primary carrier 700, and if applicable, to switch transmit and receive operation to the secondary carrier 701. $T_{f,offset}$ may be designed as a fixed system parameter or as a configurable parameter on a system-wide or per-secondary-carrier basis. In the latter case, the value of the parameter(s) may be included in system broadcast information to MSs being served by the BS.

Figure 8:
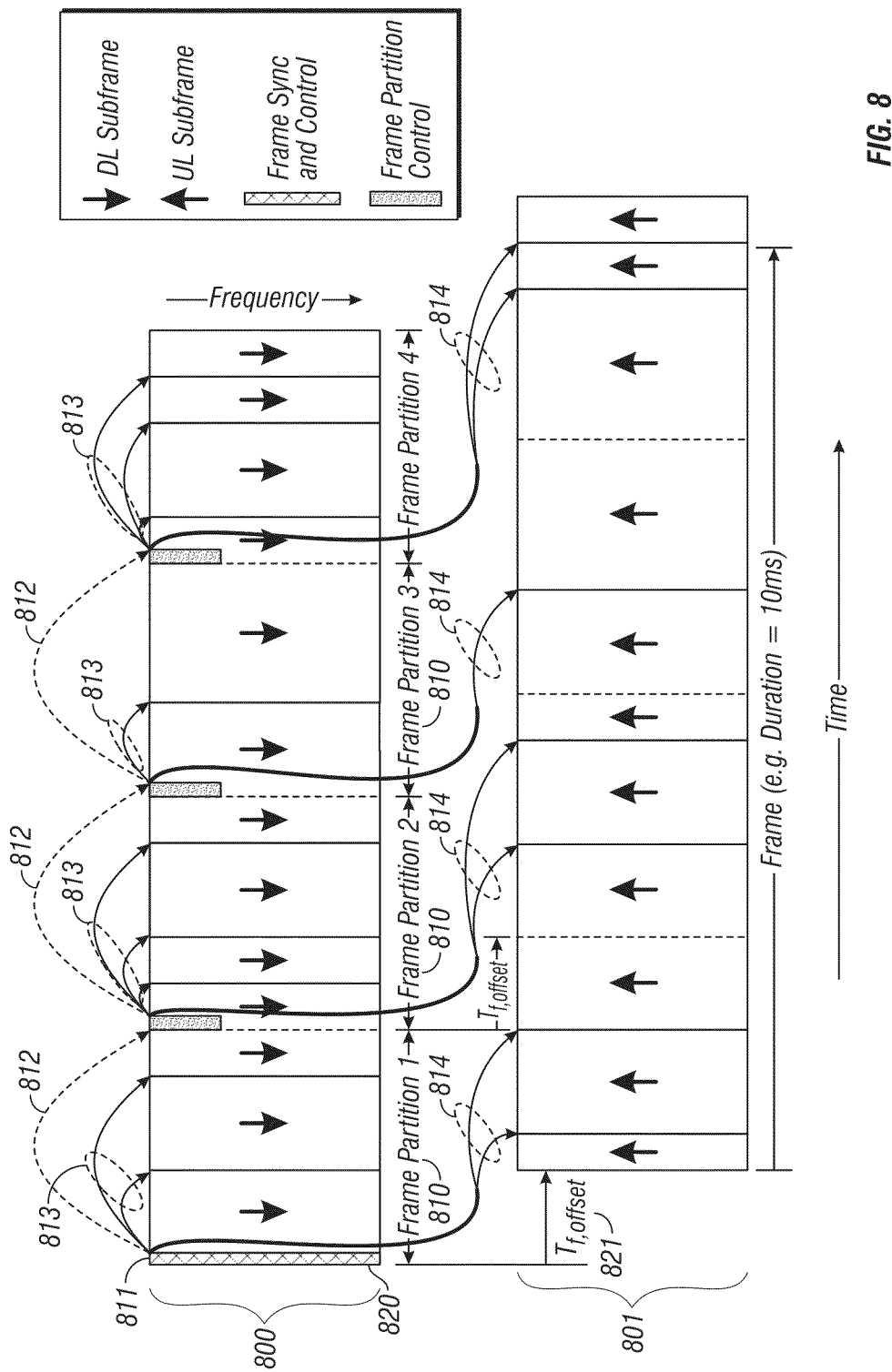
FIG. 8 illustrates how the exemplary method of secondary-carrier control as shown in FIG. 7 can be applied to an FDD mode of operation according to one embodiment of the invention.

FIG. 8 further illustrates how the exemplary method of multi-carrier support on a BS can be applied to Frequency Division Duplex (FDD) operation. In this special case of multi-carrier operation of a BS, the method of Frame Partition control at the primary carrier 800 and for the secondary carrier 801 is identical to that described for general multi-carrier operation as described above with the constraint that all subframes on the primary carrier 800 have a downlink directionality and all of the subframes on the secondary carrier 801 have an uplink directionality.

Also in the exemplary method of FDD support of FIG. 8, the parameter $T_{f,offset}$ 821 should be designed to be configurable on a per-secondary-carrier basis so that the value of the parameter can be set appropriately depending on whether only full FDD MSs are supported or half-duplex FDD (H-FDD) MSs need to be supported also. H-FDD MSs do not transmit and receive at the same time. In the H-FDD case, sufficient delay must be introduced by $T_{f,offset}$ to allow sufficient non-overlap of the associated Frame Partitions between the primary carrier 800 and the secondary carrier 801 so that downlink and uplink transmissions of sufficient sizes can be performed to an H-FDD MS. For example, the Frame Partitions may be set equal in size and the delay $T_{f,offset}$ may be set to the size of the Frame Partition to essentially provide an alternating pattern for a particular Frame Partition between the primary and secondary carriers. If only full FDD MSs are supported on a particular BS, the value of $T_{f,offset}$ may be set substantially shorter since the MS can receive on the primary carrier 800 and transmit on the secondary carrier 801 simultaneously; in this case, time need only be allotted for the MS to receive and process the Frame Partition control information 814 for the secondary carrier. A shorter value of $T_{f,offset}$ allows faster exchanges of data between a BS and MS, which is especially relevant for control signaling exchanges—this can improve performance of certain operations that benefit substantially from fast signaling exchanges, such as Hybrid Automatic Repeat Request (HARQ) operation.

Another embodiment of the present invention describes a new approach to define a proposed IEEE 802.16m standard (16m) frame structure with legacy support for the IEEE 802.16e standard (16e) frame structure.

The proposed IEEE 802.16m standard may be important in the future and the 16m frame structure needs to have an adaptable, evolvable foundation. However, the legacy 16e frame structure imposes constraints that limit its adaptability. Thus, it is desirable to design the 16m frame structure to minimize degradation to 16m performance while serving legacy 16e mobile stations on the same carrier. Furthermore, it is important to avoid two different 16m designs: one for pure 16m base station (BS) and the other for 16m BS with 16e legacy support.

According to an embodiment of the invention, the new approach to 16m frame design comprises the following: (1) start with frame design tailored to meet 16m requirements (e.g., shorter delay, lower control overhead, etc.); (2) add enough flexibility to allow frame partitioning and timing to fit legacy 16e frame requirements; and (3) fit legacy 16e frames and subframes into the 16m frame structure by appropriate resource reservation (16m frame structure elements and control are the same regardless whether the 16m frame structure provides legacy support or not).

An exemplary definition of an OFDM/OFDMA frame operating in Time Division Duplex (TDD) mode in accordance with one embodiment of the invention is shown in FIG. 1. According to an embodiment of the invention, the 16m frame structure provides greater flexibility in setting subframe parameters. First, frame duration is not tied to the number and direction of subframes. Second, frame duration is also not tied to meeting Quality of Service (QoS) delay requirements. Third, tradeoff between capacity and delay can be controlled via subframe settings. This flexibility in setting subframe parameters allows easy adaptation of many different scenarios. For example, alternating short subframes may be used for bi-directional real-time traffic.

The 16m frame structure has a 16m-specific preamble in the Frame Sync & Control signal. The Frame Sync & Control signal contains at least control parameters applicable to entire frame, and may contain control information for subframes within the frame. The control information for subframes may also be distributed in subframes.

Flexibility is an important aspect in 16m frame design. According to an embodiment of the invention, the parameters in the 16m frame structure are dynamically configurable. The 16m frame structure may have a longer frame compared to legacy 16e frame. However, longer frames do not equate to longer subframes, and frame duration and subframe duration are as independent as possible. Subframes are distinguished by a direction and a set of physical (PHY) level properties. Most PHY properties are allowed to change from subframe to subframe.

Figure 9:
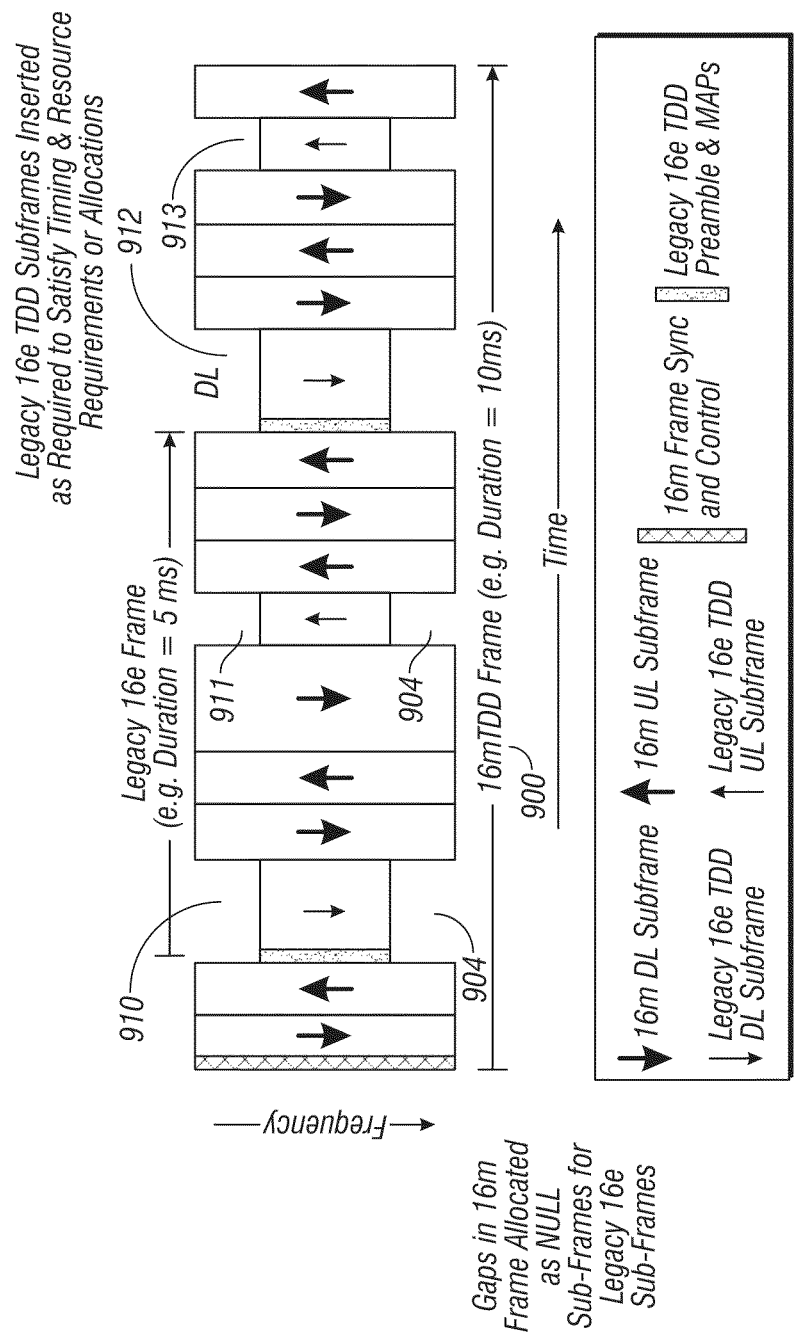
FIG. 9 illustrates an 802.16m Time Division Duplex frame structure with legacy 802.16e support according to one embodiment of the invention.

FIG. 9 illustrates legacy 16e support in a 16m frame structure according to an embodiment of the invention. According to this embodiment of the invention, the 16m frame structure 900 retains many of the attributes of the flexible frame depicted in FIG. 1. In addition, as shown in FIG. 9, certain NULL subframes 904 in the 16m frame are reserved for legacy 16e use. There are no 16m transmissions in the time durations of those "NULL" subframes 904. These time durations are reserved for use by subframes 910, 911, 912 and 913 of the legacy 16e frame.

The 16m frame has its own preamble which is ideally orthogonal to the existing preamble for legacy 16e. Legacy 16e MSs would acquire frame synchronization with legacy 16e preamble while 16m capable MSs would synchronize to the new 16m preamble.

There is a fixed relative offset between the start of 16m frame and the start(s) of legacy 16e frames that reside within the time duration of the 16m frame. This can be achieved by setting 16m frame duration to be an integer multiple of the embedded legacy 16e frame duration.

The parameters of OFDMA physical layer (PHY) in the 16m subframes may be different from those in legacy 16e subframes. Radio resource management is provided for determining what proportion of radio resources are available for 16m data transmission vs. legacy 16e data transmission.

In accordance with one embodiment of present invention, the 16m frame design is not unnecessarily constrained by legacy 16e support. In one embodiment, a new 16m frame structure is defined to satisfy the 16m requirements with respect to frame structure. Legacy 16e support is treated as a separate frame structure embedded in the 16m frame, and the 16m frame control is consistent while operating with or without legacy 16e sharing. Accordingly, the 16m frame structure accommodates legacy 16e support without being limited by its constraints.

In order to maximize the advantages for 802.16m, another embodiment of the invention provides a frame structure having the most flexibility to meet 802.16m requirements. Legacy support is then added as independently as possible into this new structure. Approaching the 802.16m frame structure design this way provides several advantages over starting from the legacy frame structure and adding 802.16m support into the legacy frame structure, including: (1) minimizing the impact of the legacy frame structure on the 802.16m frame structure; (2) minimizing the degradation to the 802.16m performance while serving legacy 16e mobile stations on the same carrier; (3) allowing 802.16m operation to be consistent whether operating with or without legacy support enabled; and (4) allowing an 802.16m MS to operate in the same manner when being served by an 802.16m BS with or without legacy support enabled. In one embodiment, the 802.16m frame structure does not tightly couple parameters that should be controlled independently. Such parameters include: maximum time for opportunity to transmit in opposite direction; minimum time between frame synchronization opportunities; and parameters for scheduling relevance timeframe.

The 16m frame structure in accordance with this embodiment of the invention also provides a consistent base frame structure and frame structure elements that could be applied to all required radio carrier operating scenarios: TDD, FDD, half-duplex FDD (H-FDD), and multi-carrier.

Figure 10:
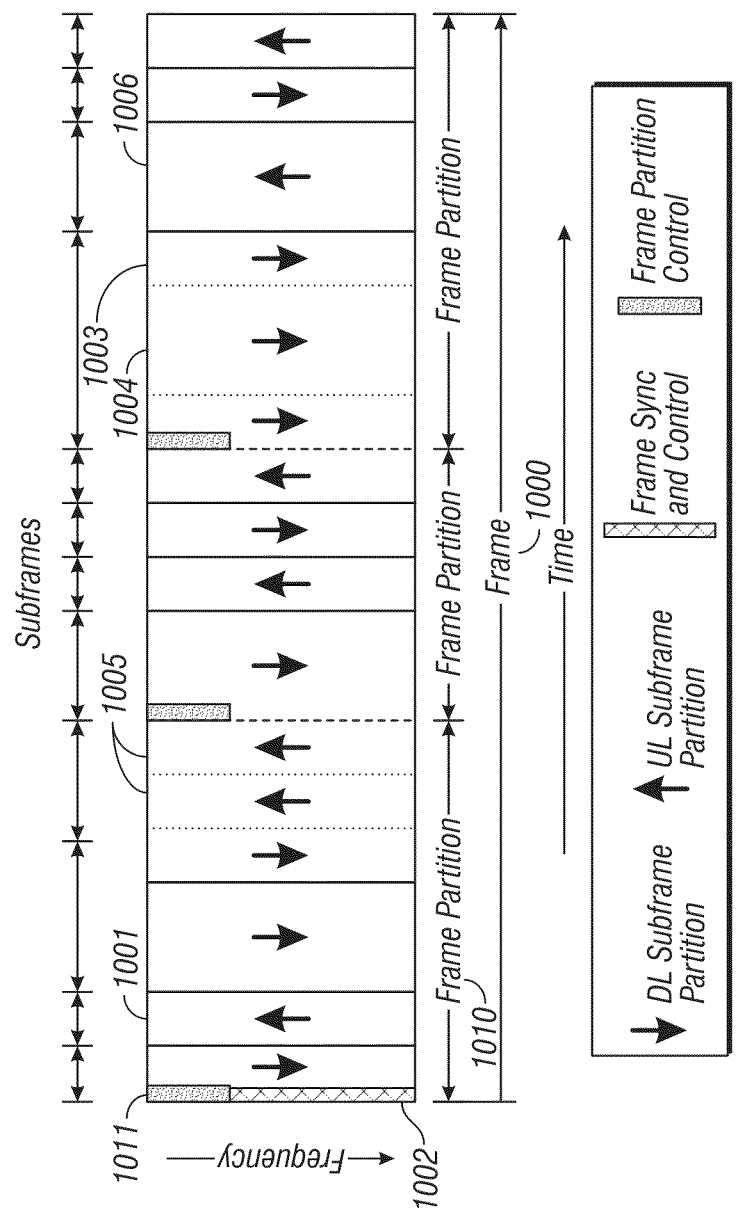
FIG. 10 illustrates the basic format and major elements of a proposed 802.16m frame according to one embodiment of the invention.

FIG. 10 illustrates the basic format and major elements of the proposed IEEE 802.16m frame according to one embodiment of the invention. This format provides sufficient flexibility to allow this base frame definition to be catered to various operating scenarios, such as to meet varying minimum traffic QoS requirements or for different radio carrier configurations, different duplexing modes or multi-carrier operation. However, as the design matures, some of the flexibility may be sacrificed as a reasonable tradeoff to reduce frame control overhead.

Referring to FIG. 10, the base frame definition includes five elements in hierarchical order: frame; frame partition; subframe, subframe partition; and unit subframe. The base frame definition 1100 includes: a frame duration ($T_{frame}$) 1007, a Frame Sync and Control signal 1002, one or more downlink subframes 1003 and 1004 of varying durations, one or more uplink subframes 105 and 106 of varying durations. A subframe comprises an integer number of unit subframe durations ($T_{u-sub}$) 1001. Adjacent subframes may provide communications in the same direction, such as 1005 and 1003/1004, or may provide communications in opposite directions, such as 1003/1006. The first subframe 1008 is a downlink frame and contains the Frame Sync and Control signal 1002.

Also shown in FIG. 10, consecutive subframes within the base frame 1000 are grouped into Frame Partitions 1010. A frame may be comprised of a one or more Frame Partitions and the Frame Partitions may be of different durations. A Frame Partition provides more localized control of subframe structure within a frame. Another benefit of Frame Partitions is the flexibility to shorten the scheduling window to timeframes that are shorter than the duration of a frame, which can benefit the scheduling of time-critical traffic.

A Frame Partition 1010 is comprised firstly of a downlink subframe which contains a Frame Partition Control data block 1011 that is situated at a known location in the subframe (for example, located at the upper left corner of the frequency-time space of this first downlink subframe within a Frame Partition as shown in FIG. 10). Following the first downlink subframe, there may be 0 or more other subframes of varying durations and various directionalities that comprise the Frame Partition. The maximum duration of any Frame Partition is constrained by the number of unit subframe times remaining from the start of the Frame Partition to the end of the frame.

The Frame Partition Control 1011 defines the subframe structure of the Frame Partition. This subframe structure definition includes at least the following control information: 1) pointers to the time location of the start of each subframe that follows the first downlink subframe within the Frame Partition, 2) the directionality of each subframe (i.e., whether the subframe is used for downlink or uplink transmissions) that follows the first downlink subframe within the Frame Partition, 3) the time duration $T_{sub}$ of each subframe, and 4) a pointer to the start of the next Frame Partition in the frame.

A subframe is comprised of one or more subframe partitions (not shown in FIG. 10. As described above, a subframe partition is comprised of one or more unit subframes of identical or compatible configurations, and therefore, is an integer number of unit subframes in length. The number and lengths of subframe partitions are set on a subframe by subframe basis based on what may be the best configuration for the MS and traffic being serviced at a particular time. A subframe partition is characterized by a length and properties of its constituent unit subframe(s).

Figure 11:
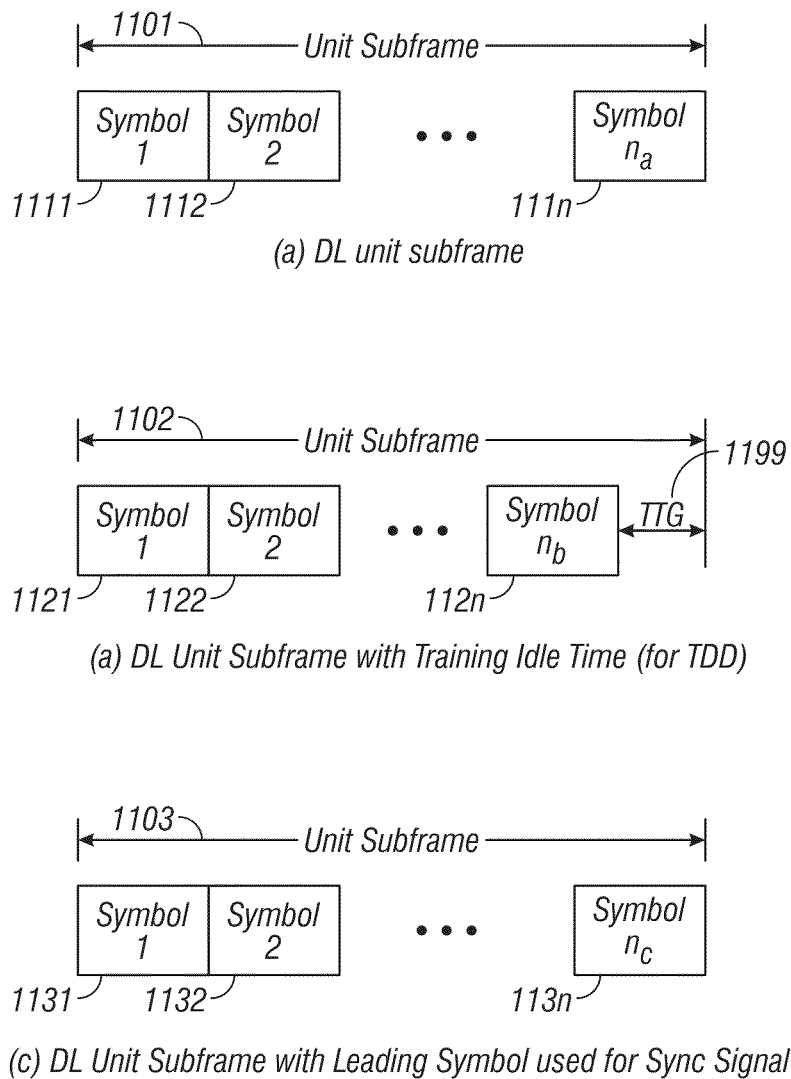
FIG. 11 illustrates some examples of unit subframe formats that can be applied to DL subframe partitions according to one embodiment of the invention.

A unit subframe may contain one or more (typically several) OFDMA symbols periods and one or more idle times across all subcarriers. FIG. 11 provides some illustrative examples of unit subframe formats that can be applied to DL subframe partitions. Example (a) in the FIG. 11 shows a unit subframe 1101 which is maximally filled with OFDM symbol periods 1111, 1112, . . . 111$n$ (that is, with ideally no idle time). This type of subframe would typically be used in all cases except as the last unit subframe of the last subframe partition in a DL subframe for the case of Time Division Duplex (TDD) operation or as the first unit subframe in the first DL subframe partition in the first subframe of a frame. Example (b) in FIG. 11 shows a unit subframe 1102 containing sufficient idle time 1199 for direction switching at the end of the unit subframe to be used as the last unit subframe in the last subframe partition of a DL subframe in TDD mode. Example (c) in FIG. 11 shows a unit subframe 1103 containing a Sync Symbol 1131 at the beginning of the unit subframe. Unit subframe 1103 would be one that can be applied where a synchronization signal is required in a subframe partition.

According to another embodiment of the invention, a similar set of unit subframe structures as those shown in FIG. 11 can be applied to UL subframe partitions. The exact set of unit subframe formats will depend on the definition of the OFDMA symbol parameters and unit subframe length, which determines the fit of symbol periods within the unit subframe.

The base frame structure illustrated in FIG. 10 is directly applicable to TDD operation. The main additional consideration for TDD operation is that the frame and subframe boundaries and subframe directions should be aligned between BSs in the neighborhood in order to minimize interference issues.

Figure 12:
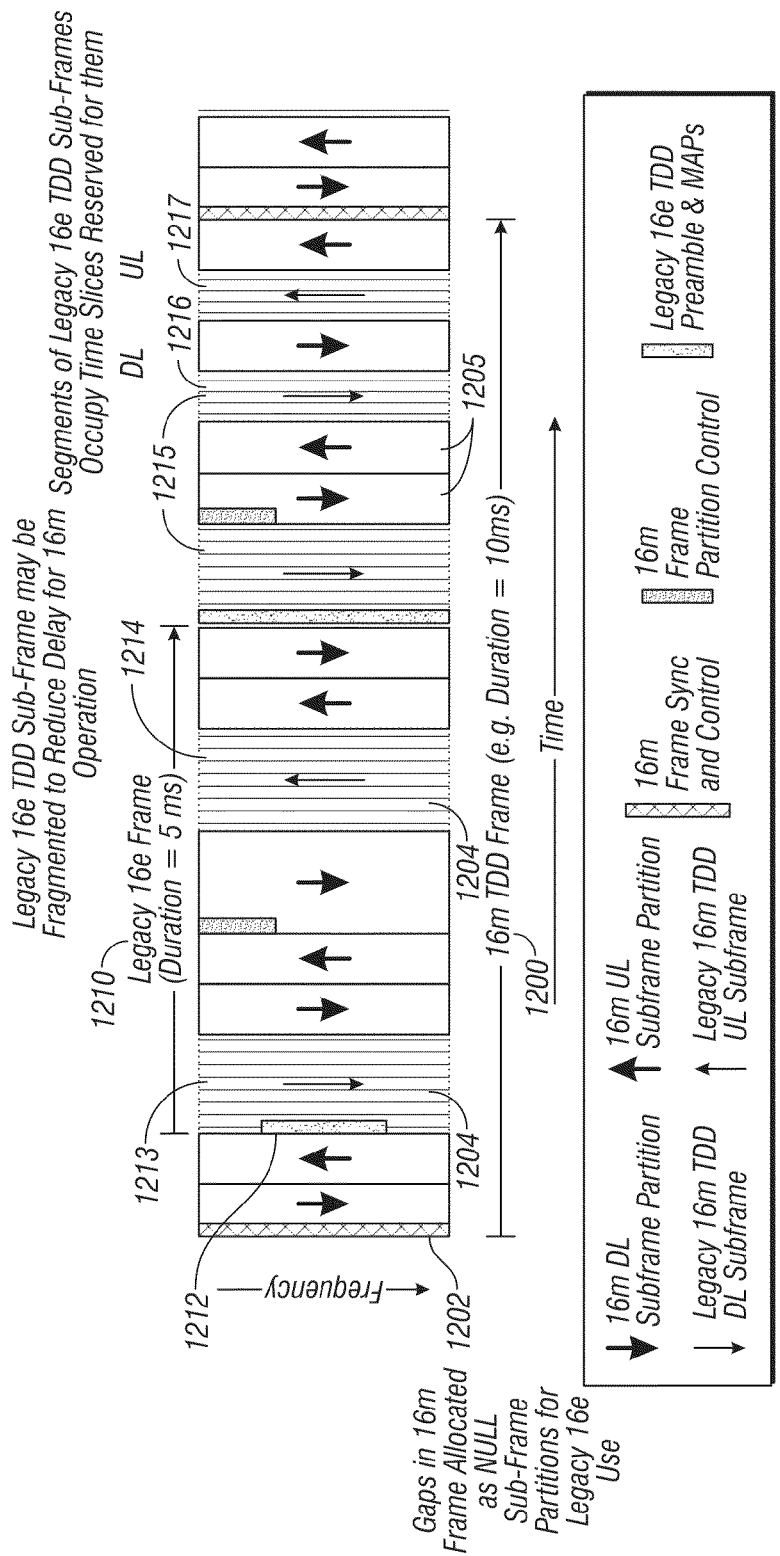
FIG. 12 illustrates an exemplary method of legacy 802.16e frame support via TDM according to one embodiment of the invention.

Support for MSs that conform to the WirelessMAN-OFDMA Reference System by an IEEE 802.16m BS is provided by the time-division multiplexing (TDM) of subframe partitions of the 802.16m frame with sections of DL and UL subframes of the legacy 16e OFDMA frame. FIG. 12 illustrates an exemplary method of legacy 16e frame support via TDM according to an embodiment of the invention.

Some aspects of the TDM operation with legacy support are described below. First, the IEEE 802.16m frame 1200 contains a separate Preamble 1202 for IEEE 802.16m operation that is orthogonal to the legacy WirelessMAN-OFDMA Preamble 1212 in order to achieve virtually transparent operation between MSs operation in IEEE 802.16m mode versus those operating according to the WirelessMAN-OFDMA Reference System. The detailed definition of the new Preamble is to be determined.

Second, the length of the IEEE 802.16m frame 1200 is set to be an integer multiple of the legacy WirelessMAN-OFDMA frame length of 5 milliseconds. This allows a fixed offset to be maintained between the start of the IEEE 802.16m frame and the starts of one or more legacy WirelessMAN-OFDMA frames that overlap within the IEEE 802.16m frame.

Third, the IEEE 802.16 frame 1200 uses NULL subframe partitions 1204 in the frame to reserve parts of the frame for the legacy WirelessMAN-OFDMA frame 1210. A NULL subframe partition is defined to be one in which no IEEE 802.16m transmissions are generated either by the BS or MS. For example, the time durations of NULL subframe partitions 1204 are reserved for use by parts 1213 and 1214 of the legacy 16e frame 1210.

Fourth, the IEEE 802.16 frame uses existing mechanisms provided by the legacy WirelessMAN-OFDMA Reference System to notify legacy WirelessMAN-OFDMA MSs of gaps in the DL and UL subframes that are reserved for legacy use. Such gaps may be located at any symbol offset within a DL or UL subframe including being inserted in the middle of a DL or UL subframe to reduce the delay impact on IEEE 802.16m operation. An example of this is shown in FIG. 12 where the DL subframe 1215 of the second legacy WirelessMAN-OFDMA frame is fragmented into two by the insertion of a pair of IEEE 802.16m subframes 1205 within the legacy DL subframe timeframe.

Figure 13:
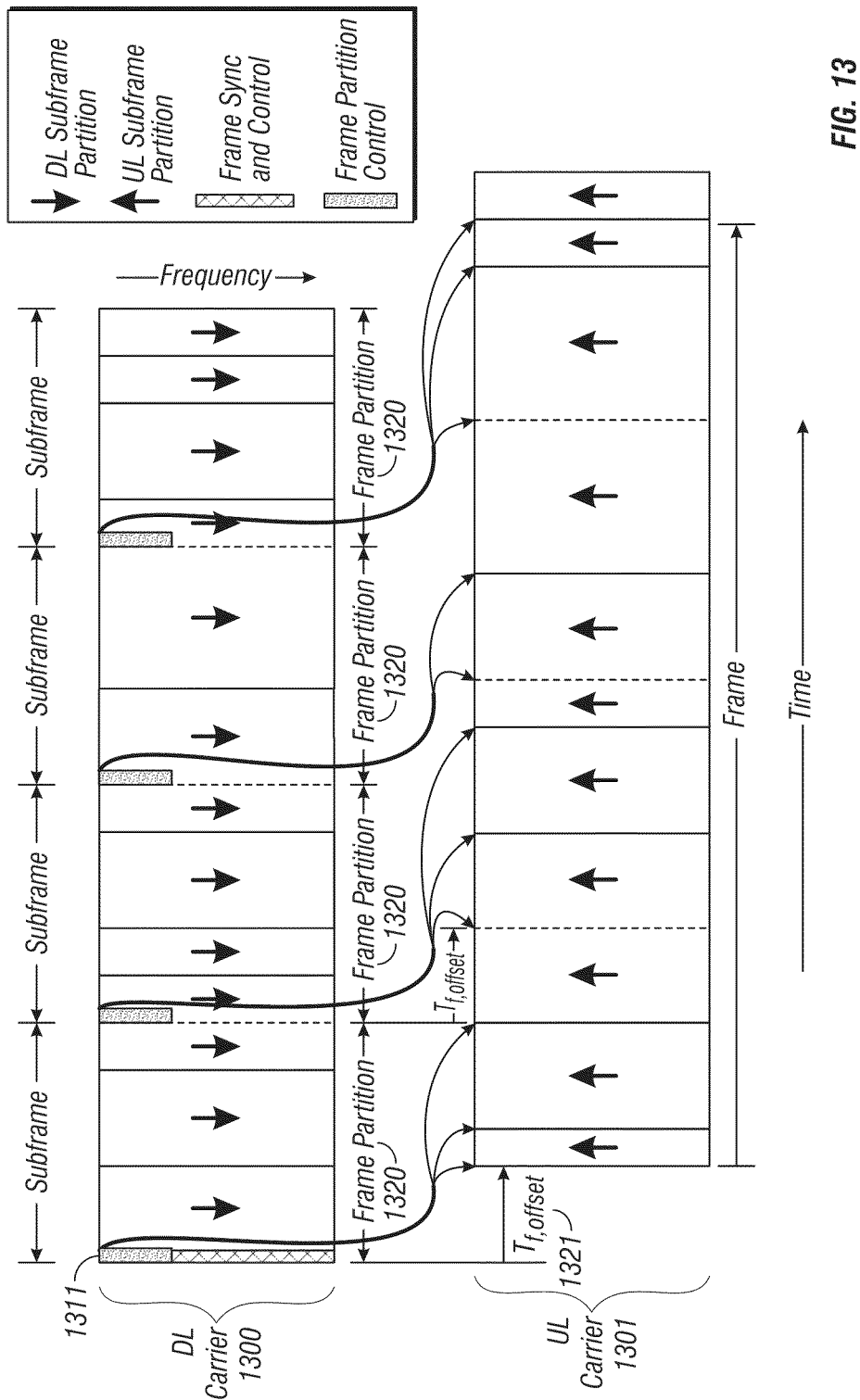
FIG. 13 illustrates an FDD frame structure according to one embodiment of the invention.

According to an embodiment of the invention, an extension of the base frame structure of FIG. 10 for operation on multiple simultaneous carriers on a BS provides the FDD frame structure as a specific sub-case. This extended multicarrier frame structure with specific application to FDD is illustrated in FIG. 13.

The FDD frame structure shares the same frame structure elements as the TDD frame structure with the identical elements and control appearing in the DL carrier 1300, which is considered the primary control carrier. Besides providing control of the frame structure and radio resource allocation within the DL carrier itself, as a primary control carrier, it also provides the frame structure and radio resource allocation control for the UL carrier 1301, which is considered a secondary carrier that is bound to the primary control carrier.

The type of control information provided by the primary control DL carrier pertaining to the secondary UL carrier may be grouped into two categories: 1) semi-static and 2) dynamic. The semi-static control information may be configurable and generally remains constant for extended periods of time (generally until some system configuration is changed) and so may be communicated as system broadcast information. The dynamic control information generally changes from one instance of the element to the next to which the control information pertains.

The semi-static information may include the following FDD frame control data: the location and size of the secondary UL carrier 1301, the mapping of the carrier to a carrier identifier; the time offset, $T_{f,offset}$ 1321, from the start of the frame at the primary control DL carrier to the start of the same frame at the secondary UL carrier. The time offset $T_{f,offset}$ 1321 provides some allowance for the MS to receive and process control information at the primary carrier before it needs to be applied at the secondary UL carrier. To support half-duplex FDD (H-FDD) operation, this offset 13121 may also include allowance for channel switching from the primary control DL carrier to the secondary UL carrier and for ensuring sufficient non-overlap time between the frame partition at the primary control DL carrier and the same frame partition at the secondary UL carrier. There is a separate $T_{f,offset}$ for each secondary carrier.

The dynamic control information is primarily associated with each frame partition and so to support FDD (and generally multi-carrier) operation, a new set of control data for the associated frame partition at the secondary UL carrier is included in the Frame Partition Control signal 1311 sent by the primary control DL carrier 1300 for each frame partition 1320.

The frame partition control signal 1311 for the secondary UL carrier 1301 includes the subframe configuration within the frame partition. For FDD sub-case of multi-carrier operation, all subframes on the primary control carrier are downlink and all subframes on the secondary carrier are uplink. Because of this, there is generally no need for more than one subframe per frame partition since the primary characteristic of a subframe is its directionality.

The frame partition control signal 1311 also includes the subframe partition configuration within each subframe in the frame partition, the configuration and assignment of data allocations within each subframe partition, and the time offset, $T_{fp,offset}$, that specifies the offset of a frame partition on the primary control DL carrier to the associated frame partition at the secondary UL carrier. Having separate time offsets for each frame partition allows the frame partitions at the secondary carrier to be a different length from the associated frame partition at the primary control DL carrier.

It is desirable that the design of 802.16m enables 802.16 to be a cost-effective, global, and competitive technology well into the future. Meeting such needs requires some balancing between how 802.16m will be constrained by the requirement to support legacy MSs while meeting the needs as a global IMT-Advanced technology. One of the foundations of 802.16m technology will be the configuration of the OFDMA technology that serves as the base physical layer multiple access and transmission technology for 802.16m. In order for 802.16m to be such a cost-effective, competitive, global technology, a new approach to OFDMA configuration is adopted in accordance with one embodiment of the invention, wherein the subcarrier spacing is fixed to a value that serves well the radio environments that 16m is intended to operate in, and is highly compatible with available and potential future carrier bandwidths. According to one embodiment of the invention, the physical layer of 16m is based on a fixed subcarrier spacing of 12.5 kHz. The rationale for this approach and the selection of this particular spacing and the issues with retaining the current OFDMA parameters are described in detail below.

The IEEE 802.16m System Requirements Documents (SRD) requires that IEEE 802.16m shall meet the IMT-Advanced requirements. Furthermore, all enhancements included as part of IEEE 802.16m should promote the concept of continued evolution, allowing IEEE 802.16 to maintain competitive performance as technology advances beyond 802.16m.

On the other hand, the IEEE 802.16m SRD also requires that IEEE 802.16m shall provide continuing support and interoperability for WirelessMAN-OFDMA Reference System which is defined as system compliant with the capabilities set specified by WiMAX Forum Mobile System Profile Release 1.0. For example, based on the backward compatibility requirements, 802.16m BS shall support 802.16m and legacy MSs while both are operating on the same RF carrier.

But there are a lot of problems existing in current legacy system design. Some of them have an unfavorable impact on system implementation, network deployment and equipment cost. So the inheritance of legacy system's drawbacks shall be prevented when designing 802.16m system.

OFDMA numerology is the base of OFDM technology and directly affects the frame structure design, which is one of the basic elements of the Physical Layer. The section below describes some problems caused by OFDMA numerology which is used by legacy system and their effect on current legacy system.

Problem No. 1 is that legacy numerology cannot ease the pain of legacy support. The legacy systems with 5/10/20 MHz, 3.5/7 MHz and 8.75 MHz bandwidths have different subcarrier spacing values which are derived based on different series bandwidths, and therefore different sets of sampling frequencies. Such incompatible sampling frequency sets impose unnecessary complexity for equipment to support the various bandwidths. Based on the legacy support requirements, 802.16m BS shall support 802.16m and legacy MSs while both are operating on the same RF carrier. However, there are three sets of legacy numerology in the 16e (or WiMAX) deployment, namely 5/10, 7/14, and 8.75. It is desirable to support them all to ensure global roaming compatibility with common equipment and devices. However, these legacy systems not only have different numerology parameters such as subcarrier spacing, they are often located in different frequency bands. These are tremendous challenges in the 16m design to support legacy systems.

The traditional argument is that 16m system can adopt the existing legacy numerology, and can support the 16e system without much pain. However, this approach will compromise 16m performance. Assuming that 16m OFDMA design is based on the numerology that already exists in 802.16e, there are two options under this approach.

Option 1: Take the different sets of numerology as they are. The 16m MS will support all legacy sampling rates and subcarrier spacings even in green field deployment (where legacy support is turned off). This means supporting different bandwidths and different numerology sets for global roaming. This option could be the easiest way to achieve legacy support. However, the existing Long Term Evolution (LTE) and Ultra Mobile Broadband (UMB) designs have each already adopted a single set of numerology, but the 16m design is going to remain with 3 sets of numerology for 5/7/8.75 Mhz system bandwidths. With the requirement to support 16m devices global roaming, it would be difficult to reduce the costs of 16m with multiple sets of numerology. Furthermore, there are quite a few problems in today's 16e numerology (stated in detail below). For example, it is unclear how 16m will handle 6-MHz and 12-MHz system bandwidths which have been defined in 700 MHz and other bands. Creating a $4^{th}$ set of numerology for them is not a good option. It is hard to predict what other bandwidths will be allocated for the IMT-Advanced Bands. Continuing adding new sets of numerology will continue to require more costly and complex designs for future 16m. Other competing technologies are using single sets of numerology and design to support different system bandwidths in different bands to achieve global roaming, and 16m would not have much competitive edge. Thus, option 1 is not very promising.

Option 2: Take one of the legacy sets of numerology (for example, the popular 5/10 MHz). The MS will still need to support different sets of numerology for legacy support—namely 7/14 MHz and 8.75 MHz. The argument of sharing only one set of numerology between 16m and 16e design will no longer be true. At least we cannot have one set of numerology for 16m design for global roaming. Since a 16m MS design would need to support multiple sampling base frequencies for legacy support anyway, such as providing support for both 16m (2.5 GHz, 10.9375 kHz) and 16e (3.5 GHz, 7.8125 kHz) using a rate change filter with one crystal or via separate crystals, then there is no difference in design complexity regardless of the subcarrier spacing used by 16m—either 10.9375 kHz or other subcarrier spacing such as 12.5 kHz. However, as discussed below, there are many issues with using the 10.9375 kHz subcarrier spacing.

Problem No. 2 is that legacy numerology has low spectral efficiency due to unused guard subcarriers. The numerology based on a typical legacy 16e design can be found in Table 310a of IEEE 802.15e 2005. Out of 914 subcarriers that fall into the 10 MHz bandwidth, there are only 840 subcarriers that can be used to transmit information—8.8% of the bandwidth is wasted. Furthermore, the bandwidth occupied by the 914 subcarriers does not fully fill the 10-Mhz carrier bandwidth. The following is the formula on how to calculate the maximum frequency efficiency:

$$n_{Efficiency} = \frac{R_{Modulation} \times n_{UsedSubcarriers}}{T_{symobol} \times BW_{System}} \quad \text{(Eq. 2-1)}$$

where $R_{Modulation}$ is modulation rate (e.g., 4 for 16QAM), $n_{UsedSubcarriers}$ is number of used subcarriers within the nominal system bandwidth, $T_{symobol}$ is symbol period, and $BW_{System}$, is the nominal system bandwidth.

Let's set cyclic prefix (CP)=0 to calculate the maximum $n_{Efficiency}$ of the system.

$$T_{symobol} = \frac{1}{f_\Delta} \quad \text{(Eq. 2-2)}$$

where $f_\Delta$ is subcarrier spacing.

$$BW_{System} \geq n_{MaximumSubcarriers} \times f_\Delta \quad \text{(Eq. 2-3)}$$

where $n_{MaximumSubcarriers}$ is the maximum number of subcarriers that a nominal system bandwidth can have.

Let's substitute Eq. 2-2, and Eq. 2-3 into Eq. 2-1, we can conclude as following:

$$n_{Efficiency} \leq \frac{R_{Modulation} \times n_{UsedSubcarriers}}{n_{MaximumSubcarriers}} \quad \text{(Eq. 2-4)}$$

The frequency efficiency is proportional to the number of used subcarriers number over the maximum number of subcarriers within the system bandwidth. We can see if we can use the 73 Guard Subcarriers ($n_{MaximumSubcarriers} - n_{UsedSubcarriers} = 914-841=73$) and 1 DC subcarrier to transmit data and divided it by the maximum number of subcarriers of 914, the new 16m system can be immediately 8.8% more efficient. The proposed 16m numerology described in one embodiment of the invention allows all subcarriers to be used for data transmission without Guard Subcarriers since the subcarrier spacings between adjacent abutting carriers are aligned. This makes operation with the proposed 16m numerology to be 8.8% more efficient by design when compared to PUSC operation with the existing 16e numerology. When the operator bandwidth has sufficient guard band around a carrier, then the 8.8% would not be wasted.

Problem No. 3 is that legacy numerology incurs capacity loss in multi-carrier deployment due to the non-aligned subcarriers in adjacent carriers. With the current WirelessMAN-OFDMA Reference System, the center frequencies of carriers are located on a 250-kHz raster from the spectrum band edge. The 250-kHz raster is commonly used since it divides evenly into all carrier bandwidths (which are typically set in multiples of 0.5 or 1 MHz), and is fine enough to allow flexibility in fine-tuning the location of carriers within spectrum bands or blocks within the band, but yet is somewhat coarse to reduce the number of potential center frequency locations (and thereby limit MS search times for operating carriers). Since the 250-kHz raster can be evenly divided into the available and typical carrier bandwidths, adjacent carriers can be placed abutting to each other and thereby maximize the usage of the available spectrum. An example of this type of RF deployment is illustrated in FIG. 14 where two adjacent 5-Mhz carriers are deployed with legacy subcarrier spacing.

Figure 14:
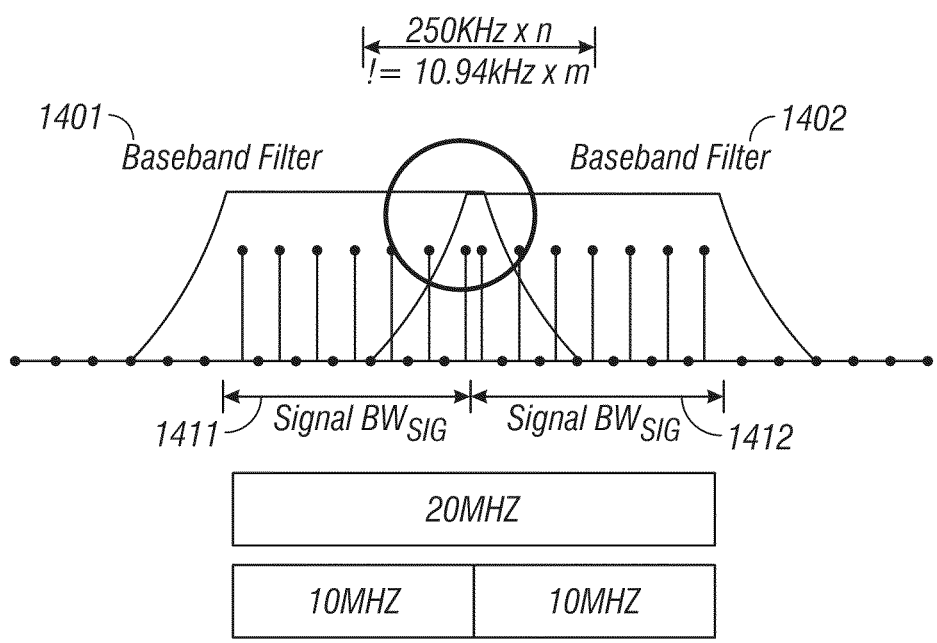
FIG. 14 illustrates an exemplary operation of adjacent carrier and overlay carrier deployments with legacy subcarrier spacing.

Also shown in FIG. 14 is the issue with using the legacy subcarrier spacing of 10.9375 kHz for the 5 and 10-MHz bandwidths in this scenario—since there is not an integer number of subcarriers from the carrier center frequency to the carrier edge, the subcarriers are not aligned between the adjacent carriers. The nature of OFDM operation is such that transmissions on a subcarrier do not introduce interference power at points that are an integer number of subcarrier spacings from the transmitting subcarrier but do cause interference power between these points. Therefore, subcarriers not being aligned between adjacent carriers means that interference from transmissions near the edge of one carrier causes excessive interference to subcarriers near the edge of the adjacent carrier if not properly addressed. In the design of the legacy WirelessOFDMA-MAN Reference System, this issue was addressed via the combination of two approaches: 1) the reservation of a number of subcarriers at the carrier edge as unused guard subcarriers so that some interference reduction is achieved by natural decay of the transmitted signal power with increasing frequency separation, and 2) the use of a transmit filter to further reduce the interference power to the adjacent carrier to an acceptable level. Both of these approaches incur overhead: 1) loss of capacity of between 5% to more than 8% due to guard subcarriers, and 2) implementation cost/complexity due to requirement of transmit filter. Both of these overheads of the legacy system can be eliminated by simply aligning the subcarriers between the adjacent carriers.

Figure 15:
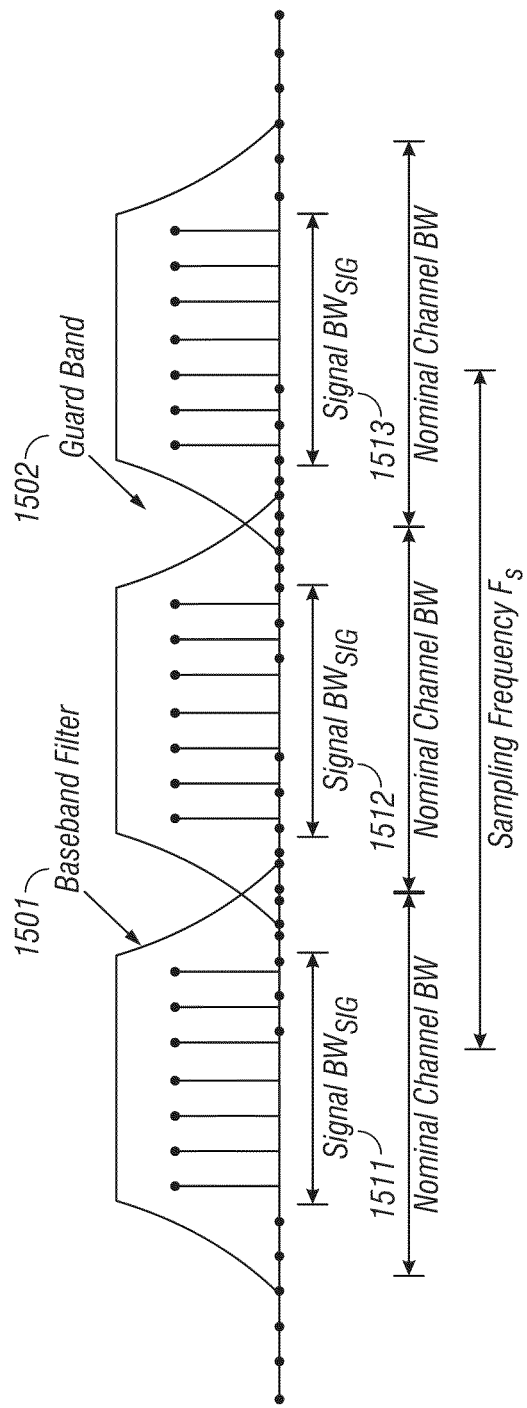
FIG. 15 illustrates an exemplary operation of multi-carrier deployment with guard bands.
Figure 16:
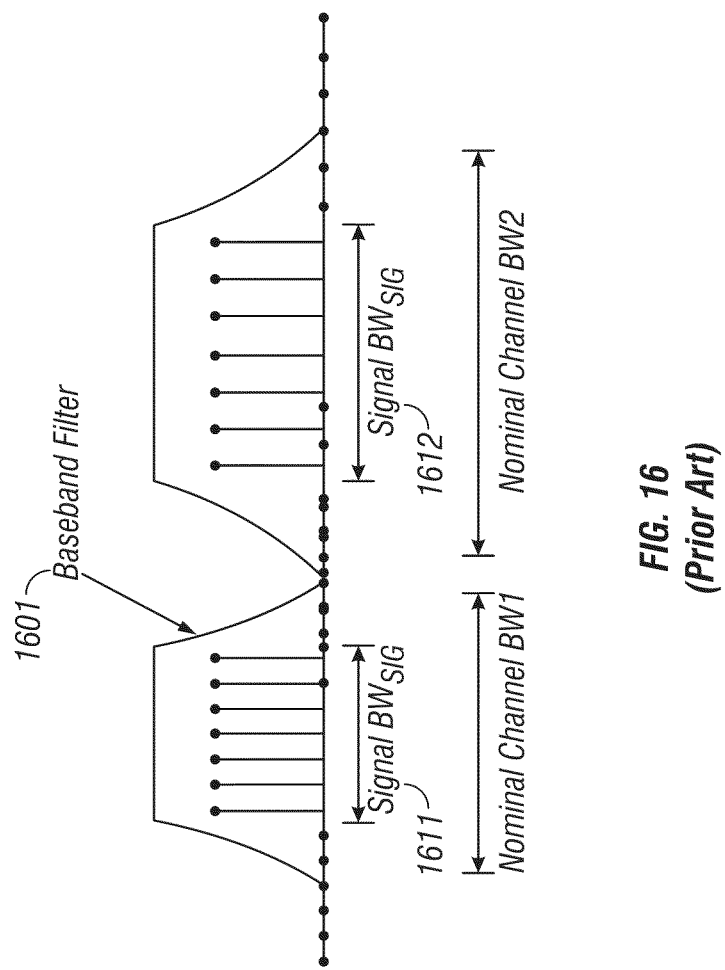
FIG. 16 illustrates an exemplary operation of mixed system bandwidths multi-carrier deployment.
Figure 17:
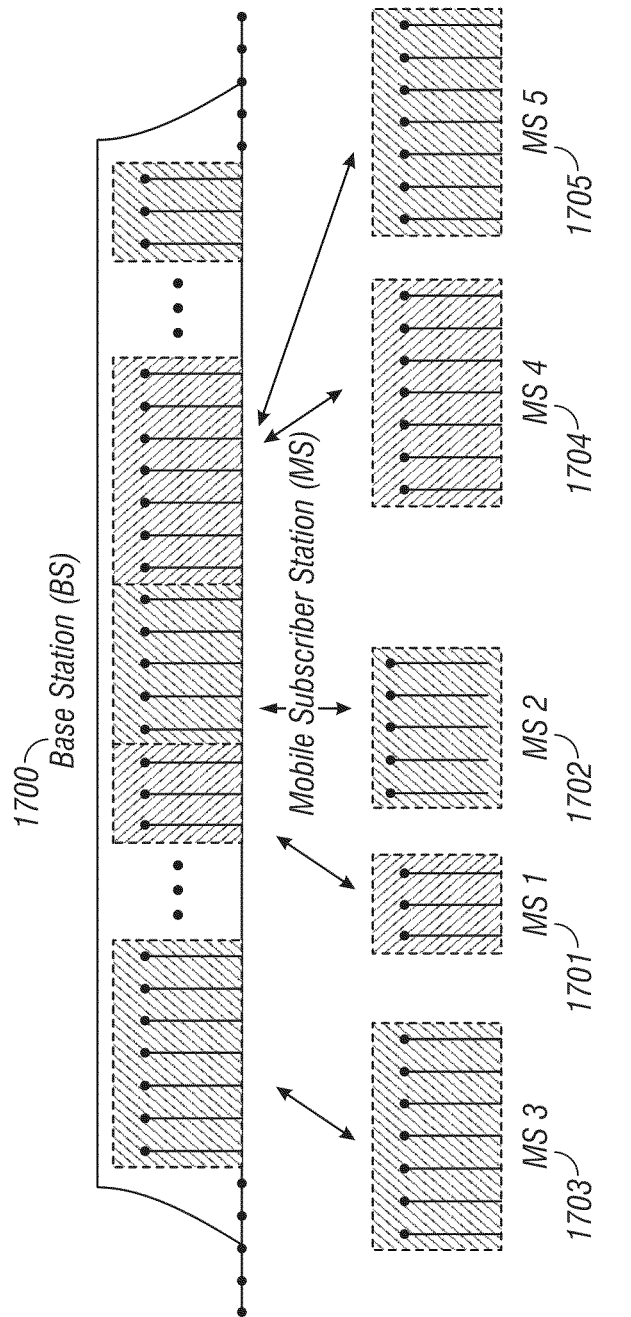
FIG. 17 illustrates an exemplary operation of mixed bandwidths multi-Carrier deployment without guard bands.

Problem No. 4 is that legacy numerology lacks multi-carrier scalability for multi-carrier deployment. Service providers often prefer scalable deployment plan in which more carriers are launched as the business grows. The incompatible subcarrier spacing unnecessarily restricts the efficiency and flexibility for 1.25 MHz series (5, 8.75, 10, 20 MHz) and 3.5 MHz series (3.5, 7, 14 MHz) to work in multi-carrier mode, with the carriers being of the same or a mixture of different system bandwidths. FIG. 15 illustrates an exemplary operation of multi-carrier deployment with guard bands. FIG. 16 illustrates an exemplary operation of mixed system bandwidths multi-carrier deployment. If the carriers are operated as adjacent carriers as illustrated in FIGS. 15 and 16, inter-carrier interference due to incompatible subcarrier spacings necessitates the presence of guard subcarriers as was discussed above. In addition, the multiple carriers cannot be operated as an overlay of several multiple bandwidths onto a common aggregate bandwidth (common FFT) in order to support devices of different bandwidth capabilities at the same time—this feature is important for supporting devices with very different cost, complexity and throughput requirements on a common air interface (e.g., from low-rate, low-cost remote data collection/monitoring devices to high-end multimedia devices). This multi-carrier mode is illustrated in FIG. 17, which illustrates an exemplary operation of mixed bandwidths multi-Carrier deployment without guard bands.

In one embodiment of the invention, 16m uses 12.5 kHz as the subcarrier spacing, and lines up with different rasters in different frequency bands and the subcarrier spacings between adjacent carriers are aligned. Therefore, this subcarrier spacing allows multi-carrier deployment with the same or mixed of different system bandwidths to be readily supported. This capability provides 16m a competitive advantage over UMB and LTE which cannot support multi-carrier deployment without guard subcarriers between neighboring carriers, as shown in FIG. 17. It demonstrates great advantages in multi-carrier deployment and the easiest way to achieve global roaming for different 16m devices.

Problem No. 5 is that changing raster to address Problem No. 3 causes other problems. A sufficient requirement to achieve the alignment of subcarriers between adjacent carriers is to define the raster as an integer number of subcarrier spacings and to separate the center frequencies of adjacent carriers by an integer number of raster spacings. There are two design approaches that can be taken to meet this requirement: (a) retain subcarrier spacing from the legacy WirelessOFDMA-MAN Reference System and define a new raster based on it; and (b) retain the existing 250-kHz raster and define a new subcarrier spacing for 802.16m.

Figure 18:
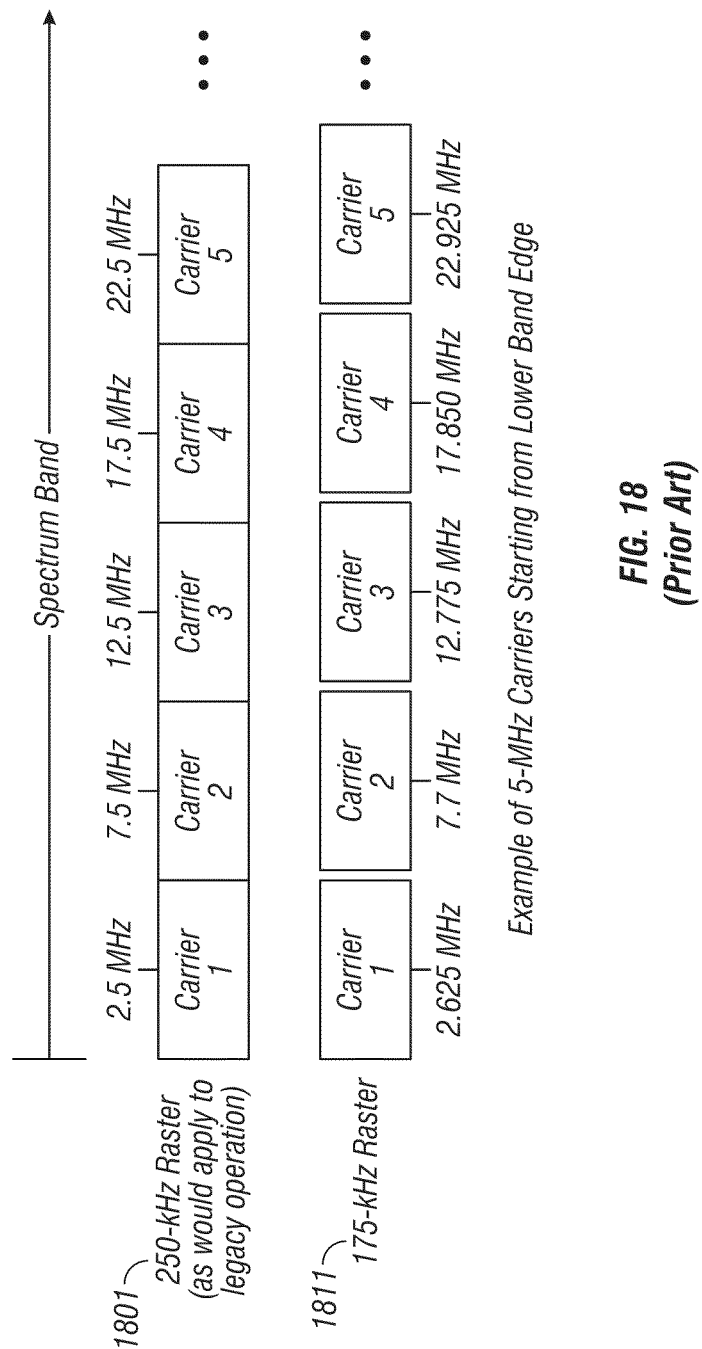
FIG. 18 illustrates an exemplary operation of carrier mis-alignment due to different rasters.

There are issues with approach (a) described above. Legacy support is adversely affected since the centering of carriers for 802.16m will be different from that for the WirelessOFDMA-MAN Reference System. This mis-alignment of carriers is illustrated in FIG. 18. An important characteristic to note from FIG. 18 is that the offsets between the two sets of carriers are not constant, which complicates the design and engineering of legacy support significantly. The offset in center frequencies resulting from the different rasters causes mis-alignment of the operating carrier bandwidth and of the subcarriers between the legacy zones and the new 16m zones when they occupy overlapping frequency spaces—an example of which is illustrated in FIG. 18. Having a separate set of carrier center frequencies for 802.16m operation due to a different raster also adversely affects the time required for 802.16m MSs to search for available 16m or legacy service due to a doubling of the number of possible center frequencies that need to be searched.

Especially for the 10.9375-kHz subcarrier spacing that applies to 5/10/20-MHz bandwidth operation, a raster cannot be defined consisting of an integer number of subcarrier spacings that also divide evenly into the 5, 10 or 20 MHz bandwidths. For this case, there is only one raster value of 175 kHz that exists in the same raster value range as 250 kHz in which the raster can be defined in units of kHz (others are in much finer units such as in Hz or fractions of Hz); and it can be easily seen that 175 kHz does not divide evenly into 5, 10, nor 20 Mhz. Given this situation, there are only two ways in which the center frequencies of adjacent carriers can be aligned to a multiple of rasters from the spectrum band edge: 1) introduce a gap between adjacent carriers as shown in FIG. 15 and FIG. 16, and 2) eliminate the need for a gap between adjacent carriers by truncating the effective bandwidth of the carrier as shown in FIG. 17. In both cases, some spectrum wastage is necessary.

Implementations are affected since a consistent centering of a carrier or a set of adjacent carriers within the same relative position within a spectrum band or block within a band cannot be defined—this may impact the availability of low-cost generic parts in designs.

The issues noted above for approach (a) do not apply to approach (b) since for approach (b), by definition there will be an integer number of subcarrier spacings in the 250-kHz raster and as noted earlier, the 250-kHz fits evenly within all carrier bandwidths that currently exist for 802.16. Using a subcarrier spacing that divides evenly into the 250-kHz raster provides the additional benefit of being able to easily accommodate other possible future bandwidths that should be considered in order to maximize the usage of allocated spectrum without incurring any of the issues related to approach (a). An example of the latter would be to support carrier bandwidths based on a 6-MHz increment since quite a few spectrum allocations in the U.S.A. for broadband wireless services are either 6 or 12-Mhz wide.

A potential drawback of approach (b) may be the need for an 802.16m BS to be able to switch between two subcarrier spacings dynamically when operating with legacy support enabled. The additional implementation complexity this incurs should be manageable since this type of dynamic switching can be handled by straightforward designs, and the need to support multiple subcarrier spacings with the same hardware exist with the WirelessMAN-OFDMA Reference System today if a BS is designed to support two or more of 5/10-MHz, 3.5/7-MHz, and 8.75-MHz operation. In addition, approach (a) also introduces disparate operation between legacy zones and 802.16m zones due to a misalignment of carrier bandwidth and subcarrier spacings between the zones. The complexity of addressing this issue with approach (a) may be greater than simply addressing two subcarrier spacings between these zones as in approach (b).

Problem No. 6 is that a single subcarrier spacing of 10.9375 kHz is required to define all the used subcarriers for each system bandwidth. The used subcarrier number of each bandwidth needs a new definition with modification needed in Problem No. 4. A new system profile is needed for each new system bandwidth. Using a 12.5 kHz subcarrier spacing, all existing bandwidth allocation in all frequency band classes can be divided evenly. There is no a need to define used subcarriers for each new system bandwidth. Today, we know that 6 MHz and 12 MHz allocated in 700 MHz Band and other Frequency Bands. It is also very hard for us to predict what other bandwidths will be allocated for the IMT-Advanced Bands. With a 12.5 kHz subcarrier spacing, we know exactly what the used subcarriers for these bandwidths are, and the 16m design will be forward compatible. When additional guard subcarriers are needed, the resource blocks on the edge can be dropped to meet out of band emission requirements.

Problem No. 7 of the legacy numerology is that it has different number of used subcarriers. For one given FFT size of legacy system, the values of the number of used subcarriers are different due to different permutation mode, even for the same channel bandwidth. For example, in a legacy system where the FFT size is 1024 and the channel bandwidth is 10 MHz, the number of used subcarrier ranges from 841 to 865 with varying bandwidth efficiency. This is a problem that can be prevented with an appropriate 802.16m frame structure design. With a common 12.5 kHz subcarrier spacing, the used subcarrier number is well determined without confusion.

On the one hand, as specified by Mobile WiMAX System Profile, only one type of cyclic prefix (CP) exists in current legacy system, which is ⅛ of useful symbol time.

Problem No. 8 is that legacy numerology uses a single cyclic prefix (CP) ratio for system deployment. Current legacy systems do not support different CP lengths for different BSs in the network, but only one effective CP value is used for all the BSs. Actually there are no mechanisms to allow a BS to change or configure the CP duration in current legacy systems. However, it is not suitable to use only one type of CP length for different deployment environments. For example, in the scenario with severe multipath (i.e., larger delay spread), a longer CP should be used to eliminate the ISI and ICI. But a simpler scenario with fewer multipath only requires a short CP in order to reduce overhead and transmission power.

On the other hand, the CP length defined by current legacy systems is a fraction of useful symbol time. But the CP duration should not be dependent on the useful symbol time, especially in current legacy systems where the useful symbol time changes between different sampling frequency sets. It causes unnecessary overheads in most of the deployment scenarios, and results in unnecessary reduction in frequency efficiency.

Problem No. 9 is that a new 16m frame design based on legacy numerology is not backward compatible with LTE frame structure in time. Due to the unequal symbol durations caused by multiple sets of existing legacy numerology, a 16m frame structure based on substructure boundaries that are aligned to symbols of the legacy numerology is unsuitable. Therefore the 16m unit subframe design (or equivalent term of "slot") can not be aligned with the current LTE design. It can not be backward compatible with LTE Superframe in time.

Now that 16m has been targeted to be adopted as an IMT-Advanced technology, it will inevitably co-exist with LTE side-by-side in the same IMT-Advanced and IMT-2000 Bands. It will be a great disadvantage if 16m cannot be deployed after LTE system has been deployed in the same frequency band. It is most likely that LTE equipment will be deployed ahead of 16m in the next few years, and the potential of 16m may be unnecessarily limited.

By changing 16m to adopt a 12.5 kHz subcarrier spacing, 16m design will be more favorable to time aligned subframe design. The subframe can be designed to time aligned with current LTE multiple 0.5 ms slot superframe structure. It is important for 16m to co-exist with LTE and the TD-SCDMA frame structure. It can be designed with PHY optimization for across RAT hand-off design, and be technically superior to existing LTE. The 16m design describe herein can become the technology candidate of LTE future evolution, and forms the base line technology for IMT-Advanced harmonization.

According to an embodiment of the invention, the IEEE 802.16m system has the following OFDMA numerology: (1) a subcarrier spacing of 12.5 kHz, (2) support for a new frame structure backward compatible to LTE, (3) multiple CP selections, and (4) a frame structure design time-aligned with LTE.

Figure 19:
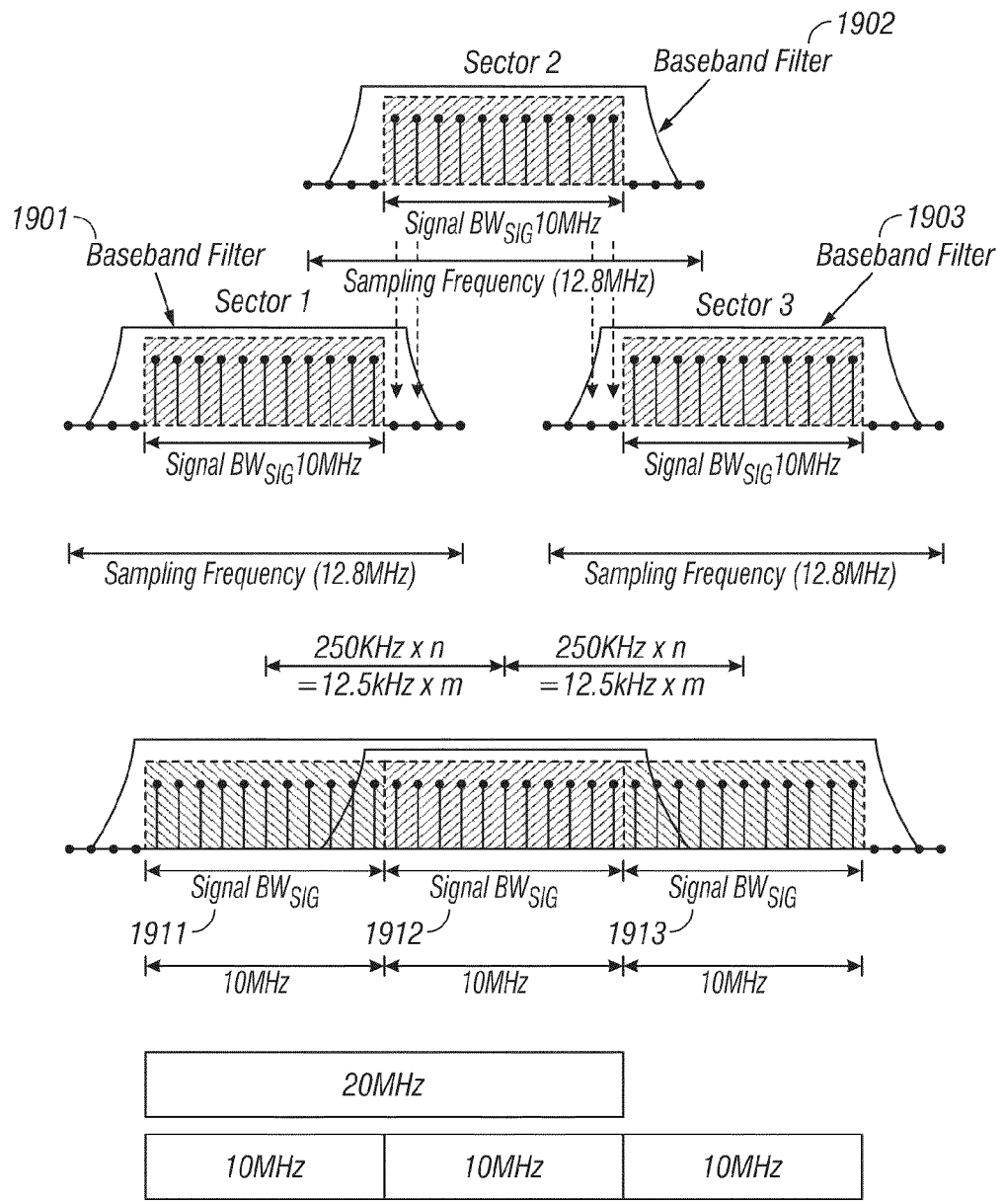
FIG. 19 illustrates an 802.16m system having 12.5-kHz subcarrier spacing according to one embodiment of the invention.

FIG. 19 illustrates a 16m system having a subcarrier spacing of 12.5 kHz. As shown in FIG. 19, the 12.5 kHz subcarrier spacing is applied for all the channel bandwidth, e.g., 5/10/20 MHz, 3.5/7/14 MHz and also 8.75 MHz. The 12.5 kHz subcarrier spacing has a property of good trade-off of mobility and frequency efficiency with CP overhead, and divides evenly into the 250-kHz channel raster. The sampling frequency of different channel bandwidths will be based on this subcarrier spacing and appropriate FFT size. It means that all the channel bandwidths will have the same base sampling frequency. The mobile stations can roam to different carrier bandwidths in different frequency bands while utilizing the same OFDMA parameter set—this feature is very crucial for a simplified coherent 4G standard and developing a healthy ecosystem.

The 16m numerology supports a new frame structure backward compatible to LTE. The existing 16e numerology will make it impossible to design a frame structure that will be backward compatible to LTE. The 16m with 16e numerology will not be able to design subframe or slots that will time aligned with LTE slots. Since 16m will be in IMT-Advanced, it will make sense to be able to deployed side-by-side with LTE in the same frequency band.

The 16m numerology supports multiple CP selections. Table 1 is an exemplary table of basic OFDM parameters with a 12.5 KHz sub-carrier spacing according to one embodiment of the invention. In accordance with one embodiment of the invention, three CP lengths based on 12.5-kHz subcarrier spacing are provided and used for different radio scenarios. These three CP lengths are needed to adequately balance the required length of CP with the loss of capacity due to the CP in order to serve the breadth of radio environments envisaged for 802.16m. These three types of CP are short CP with 2.5 us duration, which is typically used for very small cell deployments such as indoor, normal CP with 10 us duration which is typically used for outdoor urban and suburban environments, and long CP with 15 us duration which is needed for the large delay spreads that may be encountered with large rural cells.

TABLE 1

Numerology with 12.5 kHz Subcarrier Spacing

| Parameter | | Unit | Parameter Values | | | | | | | |
|---|---|---|---|---|---|---|---|---|---|---|
| Channel Bandwidth (BW) | | MHz | 5 | 6 | 7 | 8.75 | 10 | 12 | 14 | 20 |
| Sub-carrier Spacing ($\Delta f$) | | KHz | 12.5 | | | | | | | |
| Sampling Frequency (Fs) | | MHz | 6.4 | 12.8 | 12.8 | 12.8 | 12.8 | 25.6 | 25.6 | 25.6 |
| FFT size | | | 512 | 1024 | 1024 | 1024 | 1024 | 2048 | 2048 | 2048 |
| Number of Used sub-carriers (Nused) | | | 400 | 480 | 560 | 700 | 800 | 960 | 1120 | 1600 |
| CP Length ($T_{CP}$) | Short CP | µs | 2.5 | | | | | | | |
| | Normal CP | µs | 10 | | | | | | | |
| | Long CP | µs | 15 | | | | | | | |

In accordance with one embodiment of the invention, the number of used subcarriers is independent of permutation mode. For all the types of permutation modes, with the same bandwidth, the number of used subcarriers is same. In accordance with another embodiment of the invention, TDM mode is used for both downlink (DL) and uplink (UL) data transmission for legacy system support.

The 16m numerology supports a frame structure design time-aligned with LTE. Table 2 is an exemplary table of basic unit subframe parameters that are backward compatible with LTE slots according to one embodiment of the invention.

TABLE 2

Unit Subframe to Be Backward Compatible with LTE Slots

| Parameter | | Unit | Parameter Values | | | | | |
|---|---|---|---|---|---|---|---|---|
| Channel Bandwidth (BW) | | MHz | 5 | 7 | 8.75 | 10 | 14 | 20 |
| Sub-carrier Spacing ($\Delta f$) | | KHz | 12.5 | | | | | |
| Sampling Frequency (Fs) | | MHz | 6.4 | 12.8 | 12.8 | 12.8 | 25.6 | 25.6 |
| FFT size | | | 512 | 1024 | 1024 | 1024 | 2048 | 2048 |
| Number of Used sub-carriers (Nused) | | | 401 | 561 | 701 | 801 | 1121 | 1601 |
| CP Length ($T_{CP}$) | Short CP | µs | 2.5 | 2.5 | 2.5 | 2.5 | 2.5 | 2.5 |
| | Normal CP | µs | 10 | 10 | 10 | 10 | 10 | 10 |
| | Long CP | µs | 15 | 15 | 15 | 15 | 15 | 15 |
| | Long CP 2 | µs | 20 | 20 | 20 | 20 | 20 | 20 |
| Sub-frame duration | | ms | 0.5 | 0.675 | 1 | 1.5 | 2 | 2.5 |
| Number of OFDM Symbols Per Sub-frame | Short CP ($N_S$) | | 6 | 8 | 12 | 18 | 24 | 30 |
| | Normal CP ($N_R$) | | 5 | 7 | 10 | 16 | 22 | 27 |
| | Long CP ($N_L$) | | 4 | 6 | 10 | 15 | 20 | 26 |
| | Long CP 2 ($N_L$) | | 4 | 6 | 9 | 14 | 19 | 24 |

In another embodiment of the invention, the physical layer of 16m is based on a fixed subcarrier spacing of 25 kHz. Table 3 is an exemplary table of basic OFDM parameters for a 25 series (25 KHz sub-carrier spacing) for mobility mode according to an embodiment of the invention.

TABLE 3

Numerology with 25 kHz Subcarrier Spacing

| Parameter | | Unit | Parameter Values | | | | | |
|---|---|---|---|---|---|---|---|---|
| Channel Bandwidth (BW) | | MHz | 5 | 7 | 8.75 | 10 | 14 | 20 |
| Sub-carrier Spacing ($\Delta f$) | | KHz | 25 | | | | | |
| Sampling Frequency (Fs) | | MHz | 6.4 | 12.8 | 12.8 | 12.8 | 25.6 | 25.6 |
| FFT size | | | 256 | 512 | 512 | 512 | 1024 | 1024 |
| Number of Used sub-carriers (Nused) | | | 201 | 281 | 351 | 401 | 561 | 801 |
| CP Length ($T_{CP}$) | Short CP | µs | 2.5 | 2.5 | 2.5 | 2.5 | 2.5 | 2.5 |
| | Normal CP | µs | 10 | 10 | 10 | 10 | 10 | 10 |
| | Long CP | µs | 15 | 15 | 15 | 15 | 15 | 15 |
| | Long CP 2 | µs | 20 | 20 | 20 | 20 | 20 | 20 |
| Subframe duration | | ms | 0.5 | 0.675 | 1 | 1.5 | 2 | 2.5 |
| Number of OFDM Symbols Per Sub-frame | Short CP ($N_S$) | | 11 | 15 | 23 | 35 | 46 | 58 |
| | Normal CP ($N_R$) | | 9 | 13 | 19 | 29 | 39 | 49 |
| | Long CP ($N_L$) | | 8 | 11 | 17 | 26 | 35 | 44 |
| | Long CP 2 ($N_L$) | | 7 | 10 | 16 | 24 | 32 | 41 |
| Sub-frame Idle Time (TTG-DL or TTG-UL) | Short CP | µs | 32.5 | 37.5 | 22.5 | 12.5 | 45 | 35 |
| | Normal CP | | 50 | 25 | 50 | 50 | 50 | 50 |
| | Long CP | | 60 | 70 | 65 | 70 | 75 | 80 |
| | Long CP 2 | | 80 | 75 | 40 | 60 | 80 | 40 |

While various embodiments of the invention have been described above, it should be understood that they have been presented by way of example only, and not of limitation. Likewise, the various diagrams may depict an example architectural or other configuration for the invention, which is done to aid in understanding the features and functionality that can be included in the invention. The present invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:

1. A method of configuring carriers in an Orthogonal Frequency Division Multiplexing (OFDM) or Orthogonal Frequency Division Multiple Access (OFDMA) communication system, the method comprising:
setting up a first carrier with a first center frequency and a first channel bandwidth in a multi-carrier system;
setting up a second carrier with a second center frequency and a second channel bandwidth in the multi-carrier system, wherein the first carrier and the second carrier each include a plurality of subcarriers and have a same subcarrier spacing, the first channel bandwidth is adjacent to the second channel bandwidth, the first center frequency and the second center frequency is separated by an integer number of a frequency step, and the frequency step is an integer number of the subcarrier spacing, wherein the first carrier comprises a configurable length frame comprising a plurality of variable length subframes, and wherein the first carrier provides control information for the first carrier as well as the second carrier, the control information comprising respective durations of the plurality of variable length subframes, and
further comprising transmitting signals on said first and second channels with different center frequencies such that said signals on subcarriers in the first carrier do not cause interference to subcarriers in the second carrier, thereby communicating simultaneously with a first mobile station on the first carrier and a second mobile station on the second carrier, wherein the first carrier and the second carrier are processed by a base station as a single aggregated OFDM/OFDMA carrier.

2. The method of claim 1, wherein the subcarrier spacing is 12.5 kHz.

3. The method of claim 1, wherein said transmitting signals comprises transmitting signals on subcarriers of the aggregated OFDM/OFDMA carrier.

4. The method of claim 3, wherein the subcarrier spacing is 12.5 kHz.

5. The method of claim 1 wherein the control information comprises frame structure information for the first and second carriers.

6. The method of claim 1 wherein the control information comprises radio resource allocation information for the first and second carriers.

7. The method of claim 1 wherein the control information comprises information pertaining to a location and size of the second carrier.

8. The method of claim 1 wherein the control information comprises a time offset from a start of a frame at the first carrier to a start of the same frame at the second carrier.

9. The method of claim 1 wherein the control information comprises control data for one or more frame partitions at the second carrier.

10. The method of claim 1 wherein the control information comprises subframe partition configuration information for each subframe in a frame partition.

11. The method of claim 1 wherein the control information comprises configuration and assignment of data allocations within each subframe partition and a time offset that specifies an offset of a frame partition on the first carrier to an associated frame partition a the second carrier.

12. The method of claim 1 further comprising a base station communicating simultaneously with a first mobile station on the first carrier and a second mobile station on the second carrier, wherein the first carrier and the second carrier are processed by the base station as a single aggregated OFDM/OFDMA carrier, and wherein the control information comprises frame structure information for the first and second carriers.

13. The method of claim 1 wherein the control information comprises control data for one or more frame partitions at the second carrier and further comprises subframe partition configuration information for each subframe in a frame partition.

* * * * *